United States Patent
Nishimura

(10) Patent No.: US 6,661,584 B2
(45) Date of Patent: Dec. 9, 2003

(54) ZOOM LENS AND CAMERA HAVING THE ZOOM LENS

(75) Inventor: Takeshi Nishimura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/160,199

(22) Filed: May 30, 2002

(65) Prior Publication Data

US 2003/0123157 A1 Jul. 3, 2003

(30) Foreign Application Priority Data

Jun. 1, 2001 (JP) ........................................ 2001/166503
Jun. 11, 2001 (JP) ........................................ 2001/175883

(51) Int. Cl.⁷ .............................................. G02B 15/14
(52) U.S. Cl. ...................... 359/686; 359/684; 359/685
(58) Field of Search ................................. 359/686, 685, 359/684, 683

(56) References Cited

U.S. PATENT DOCUMENTS

| | | | |
|---|---|---|---|
| 5,493,447 A | * | 2/1996 | Ohtake ........................ 359/686 |
| 5,751,496 A | * | 5/1998 | Hamano ....................... 359/684 |
| 5,815,320 A | * | 9/1998 | Hoshi et al. ................. 359/686 |
| 6,342,972 B1 | * | 1/2002 | Yamanashi ................... 359/686 |

* cited by examiner

Primary Examiner—Georgia Epps
Assistant Examiner—M. Hasan
(74) Attorney, Agent, or Firm—Morgan & Finnegan LLP

(57) ABSTRACT

A zoom lens includes a first to fourth lens unit. Zooming is performed by moving the lens units so that a spacing between the first and the second lens unit at a telephoto end is larger than the spacing between the first and the second lens unit at a wide-angle end, and so that the spacing between the third and the fourth lens unit at the telephoto end is smaller than the spacing between the third and the fourth lens unit at the wide-angle end. If focal lengths of the first and the fourth lens units are f1 and f4, and if the focal length of entire system at the wide-angle end and the focal length of the entire system at the telephoto end are fw and ft, conditions expressed by $0.2 < f1/ft < 0.5$, $-0.2 < f4/ft < -0.05$ and $3.7 < ft/fw < 6.0$ are satisfied.

42 Claims, 12 Drawing Sheets

SPHERICAL ABERRATION

ASTIGMATISM

DISTORTION

TRANSVERSE CHROMATIC ABERRATION (g-LINE)

SPHERICAL ABERRATION

ASTIGMATISM

DISTORTION

TRANSVERSE CHROMATIC ABERRATION (g-LINE)

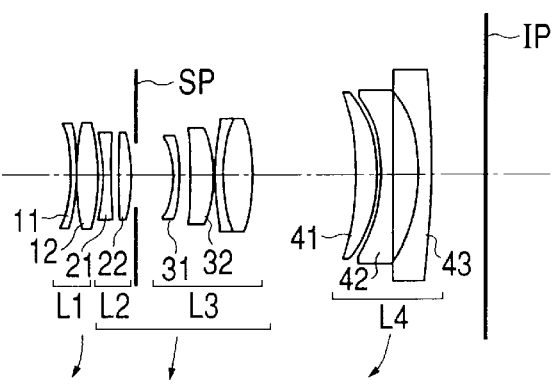
FIG. 16
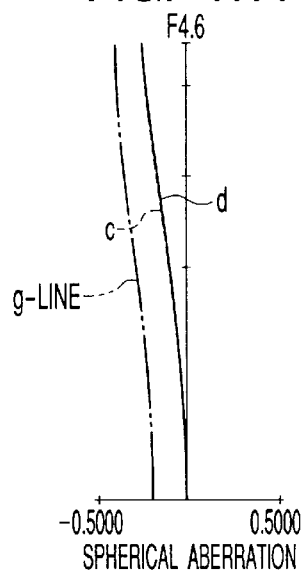
FIG. 17A
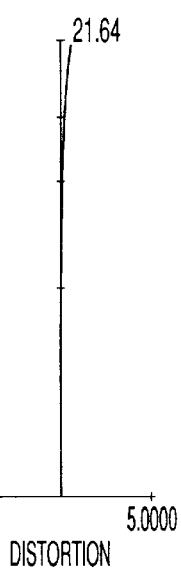
FIG. 17B
FIG. 17C
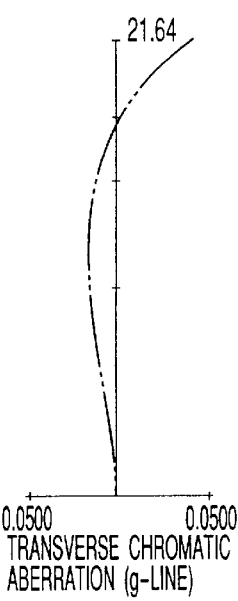
FIG. 17D
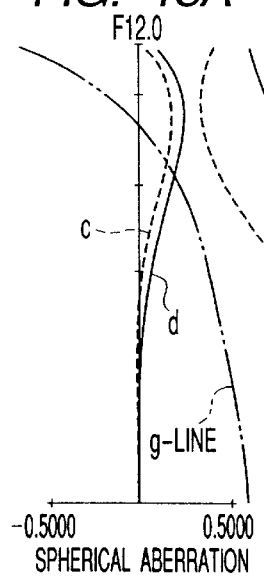
FIG. 18A
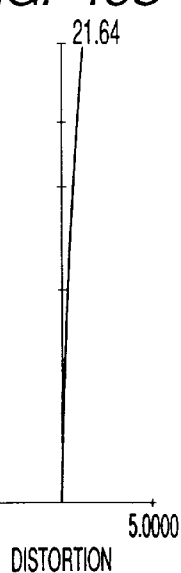
FIG. 18B
FIG. 18C
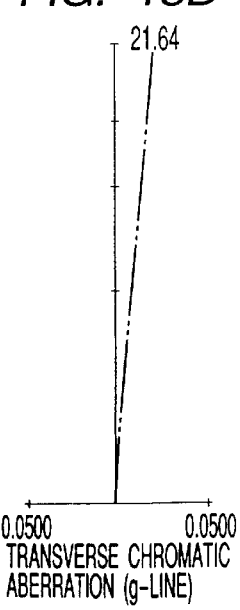
FIG. 18D

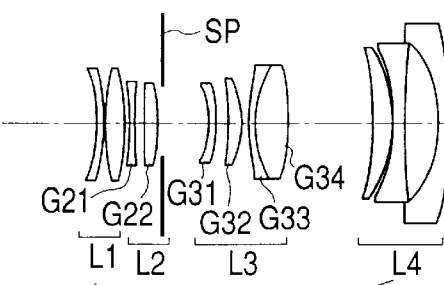
FIG. 19
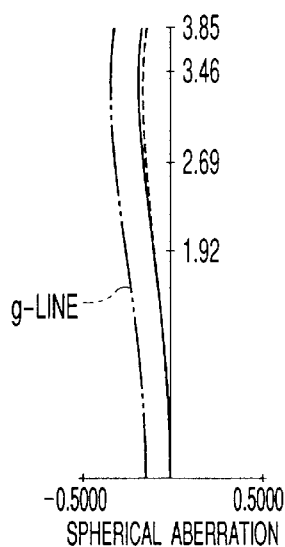
FIG. 20A SPHERICAL ABERRATION
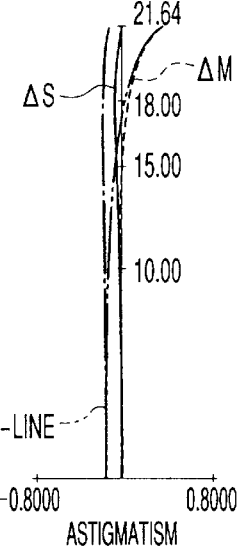
FIG. 20B ASTIGMATISM
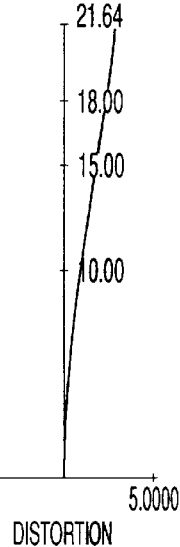
FIG. 20C DISTORTION
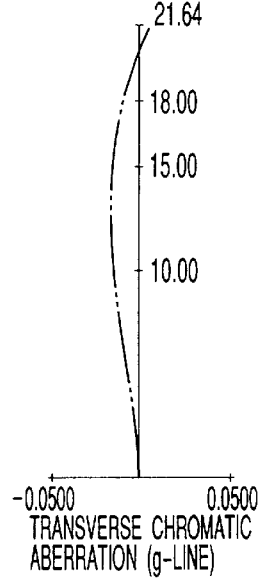
FIG. 20D TRANSVERSE CHROMATIC ABERRATION (g-LINE)
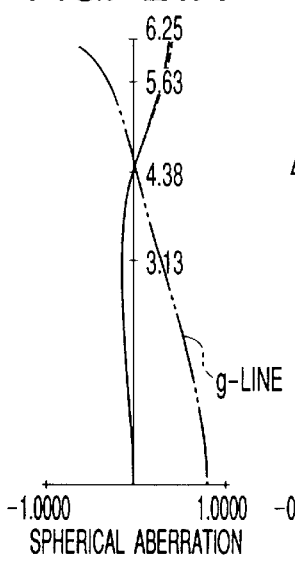
FIG. 21A SPHERICAL ABERRATION
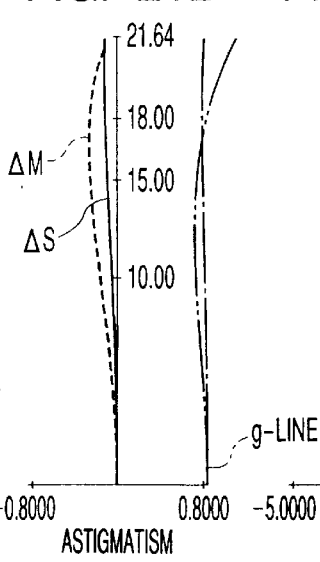
FIG. 21B ASTIGMATISM
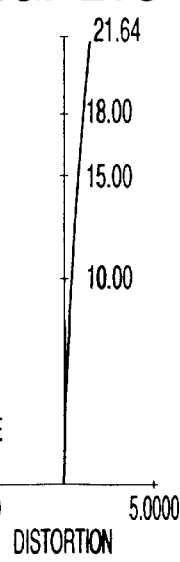
FIG. 21C DISTORTION
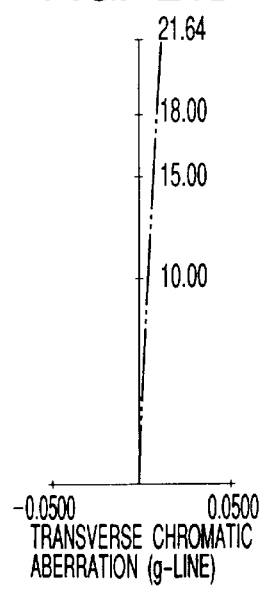
FIG. 21D TRANSVERSE CHROMATIC ABERRATION (g-LINE)

SPHERICAL ABERRATION

ASTIGMATISM

DISTORTION

TRANSVERSE CHROMATIC ABERRATION (g-LINE)

SPHERICAL ABERRATION

ASTIGMATISM

DISTORTION

TRANSVERSE CHROMATIC ABERRATION (g-LINE)

SPHERICAL ABERRATION

ASTIGMATISM

DISTORTION

TRANSVERSE CHROMATIC ABERRATION (g-LINE)

SPHERICAL ABERRATION

ASTIGMATISM

DISTORTION

TRANSVERSE CHROMATIC ABERRATION (g-LINE)

SPHERICAL ABERRATION

ASTIGMATISM

DISTORTION

TRANSVERSE CHROMATIC ABERRATION (g-LINE)

SPHERICAL ABERRATION

ASTIGMATISM

DISTORTION

TRANSVERSE CHROMATIC ABERRATION (g-LINE)

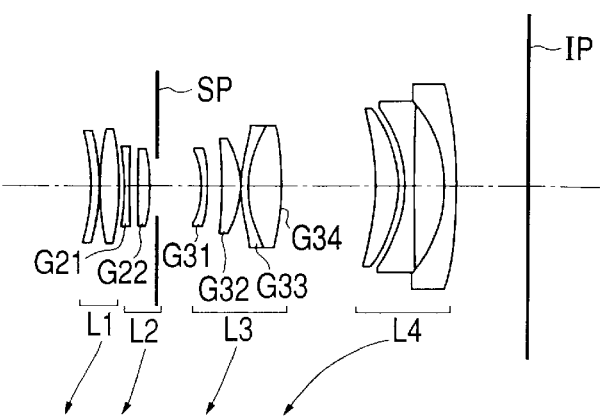
FIG. 31
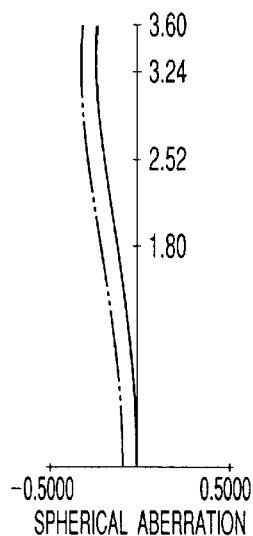
FIG. 32A
SPHERICAL ABERRATION
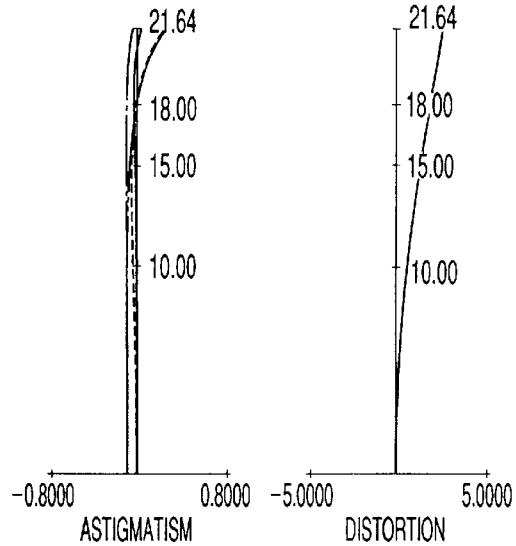
FIG. 32B
ASTIGMATISM
FIG. 32C
DISTORTION
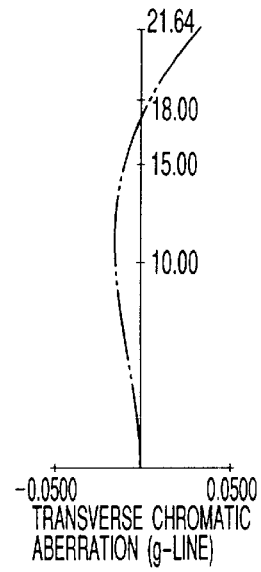
FIG. 32D
TRANSVERSE CHROMATIC ABERRATION (g-LINE)
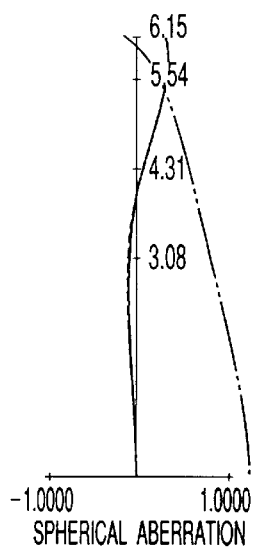
FIG. 33A
SPHERICAL ABERRATION
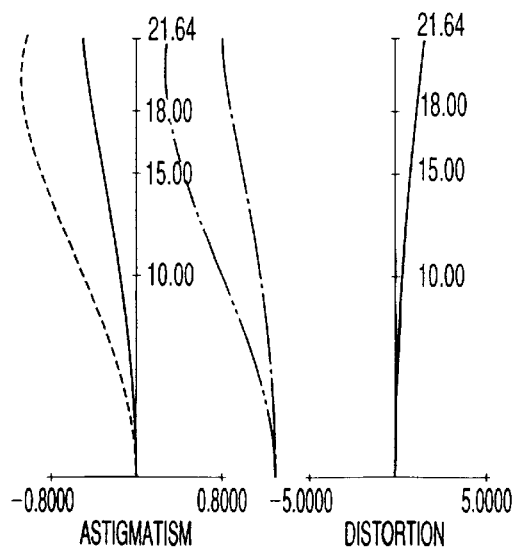
FIG. 33B
ASTIGMATISM
FIG. 33C
DISTORTION
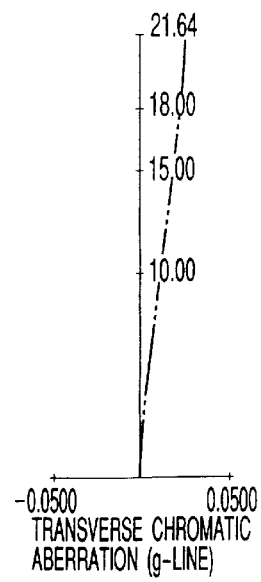
FIG. 33D
TRANSVERSE CHROMATIC ABERRATION (g-LINE)

ZOOM LENS AND CAMERA HAVING THE ZOOM LENS

BACKGROUND OF THE INVENTION

1. Field of the Invention

The present invention relates to a zoom lens and a camera using the zoom lens and, more particularly, to a zoom lens of high optical performance most suitable for a camera having a comparatively short back focus among lens shutter cameras or the like, and to a camera using the zoom lens.

2. Related Background Art

In recent years, with the miniaturization of optical devices such as lens shutter cameras, video cameras and digital cameras, there has been an increasing demand for smaller zoom lenses of a high variable magnifying power and of a shorter entire length as a photographing lens for use in such optical devices.

As a means for miniaturizing the photographing lenses, so-called positive lead type zoom lenses having a lens unit of a positive refractive power placed at the foremost position are ordinarily used. This type of zoom lens has the capability of reducing the back focus as its significant feature and is used particularly effectively in a lens shutter camera or the like which does not require a space such as that in a single lens reflex camera for placement of a quick return mirror at the rear of a lens system.

As a positive-lead zoom lens having a short back focus, a positive/negative-two-unit zoom lens is known which is formed of a first lens unit having a positive refractive power and a second lens unit having a negative refractive power, and in which the two lens units are moved to change the magnifying power. This zoom lens is simple in mechanical construction but has drawbacks in that if the variable magnifying power is increased, variation in chromatic aberration becomes large and it is difficult to correct an image plane displacement caused by magnifying power change, because only the two lens units exist and because the degree of lens design freedom is low. In the positive/negative-two-lens-unit zoom lens, therefore, the variable magnifying power ratio is limited to about 3 to 3.5 in the case of a design for achieving both a reduced size and improved optical performance.

Therefore, to obtain a zoom lens having a variable magnifying power ratio of about 4 to 5, it is necessary to adopt a lens unit construction using three units or more, i.e., the basic positive/negative-two-unit zoom lens with at least one additional lens unit.

Three-unit zoom lens formed of three lens units respectively having a positive refractive power, a positive refractive power and a negative refractive power has been proposed as a zoom lens having a comparatively short back focus and suitable for magnifying power change at a high ratio as compared with the conventional one.

Various four-unit zoom lenses formed by adding a lens unit of a comparatively low refractive power to a three-unit zoom lens have also been proposed.

The assignee of the present application proposed three-unit zoom lenses and four-unit zoom lenses in JP 06-214157 A, JP 06-214158 A, JP 06-222267 A, JP 06-250087 A, and JP 06-250088 A (five publications above correspond to U.S. Pat. No. 5,815,320), and in JP 06-294932 A (corresponding to U.S. Pat. No. 5,831,772). Each of the zoom lenses disclosed in these publications is a four-unit zoom lens having in order, from the object side, a positive refractive power, a positive or negative refractive power, a positive refractive power, and a negative refractive power, or a three-unit zoom lens having a positive refractive power, a positive refractive power, and a negative refractive power.

Other four-unit zoom lenses having in order, from the object side, a positive refractive power, a negative refractive power, a positive refractive power, and a negative refractive power have also been proposed in JP 2,579,215 (corresponding to U.S. Pat. No. 5,004,329), JP 10-301027 A, and U.S. Pat. No. 4,822,152, U.S. Pat. No. 5,272,566, U.S. Pat. No. 5,172,273, and U.S. Pat. No. 5,170,292.

For example, the method of increasing the refractive power of lens units and increasing the extent of movement of each magnifying power-changing lens unit is generally known as a method of increasing the variable zoom ratio of a zoom lens while reducing the size of the zoom lens.

However, if the method of increasing the refractive power of lens units and also increasing the extent of movement of each magnifying power-changing lens unit is simply used, variations in aberrations accompanying a change in magnifying power are increased and it is difficult to obtain improved optical performance over the entire variable magnifying power range.

SUMMARY OF THE INVENTION

In view of the above-described conventional art, an object of the present invention is to provide a zoom lens of a novel construction capable of changing the magnifying power as desired while maintaining good optical performance.

To achieve the above-described object, according to one aspect of the present invention, there is provided a zoom lens having a first lens unit having a positive optical power, a second lens unit, a third lens unit, and a fourth lens unit having a negative optical power, the first to fourth lens units being placed in this order from an object side to an image side. In this zoom lens, zooming is performed by moving the lens units so that the spacing between the first lens unit and the second lens unit at the telephoto end is larger than the spacing between the first lens unit and the second lens unit at the wide-angle end, and so that the spacing between the third lens unit and the fourth lens unit at the telephoto end is smaller than the spacing between the third lens unit and the fourth lens unit at the wide-angle end. The power and the placement of the respective lens units constituting the zoom lens described above, the lens construction of each lens unit, lens shapes, lens materials, etc., are determined from various viewpoints, as represented by way of preferred examples thereof explained in the following description of embodiments of the invention.

BRIEF DESCRIPTION OF THE DRAWINGS

FIG. 16 is a sectional view of a zoom lens according to Numerical Example 6;

FIGS. 17A, 17B, 17C and 17D are diagrams showing aberrations at the wide-angle end of the zoom lens according to Numerical Example 6;

FIGS. 18A, 18B, 18C and 18D are diagrams showing aberrations at the telephoto end of the zoom lens according to Numerical Example 6;

FIG. 19 is a sectional view of a zoom lens according to Numerical Example 7;

FIGS. 20A, 20B, 20C and 20D are diagrams showing aberrations at the wide-angle end of the zoom lens according to Numerical Example 7;

FIGS. 21A, 21B, 21C and 21D are diagrams showing aberrations at the telephoto end of the zoom lens according to Numerical Example 7;

FIG. 31 is a sectional view of a zoom lens according to Numerical Example 11;

FIGS. 32A, 32B, 32C and 32D are diagrams showing aberrations at the wide-angle end of the zoom lens according to Numerical Example 11;

FIGS. 33A, 33B, 33C and 33D are diagrams showing aberrations at the telephoto end of the zoom lens according to Numerical Example 11.

DESCRIPTION OF THE PREFERRED EMBODIMENTS

Embodiments of the present invention will be described with reference to the accompanying drawings.

Embodiment 1

Figure 1:
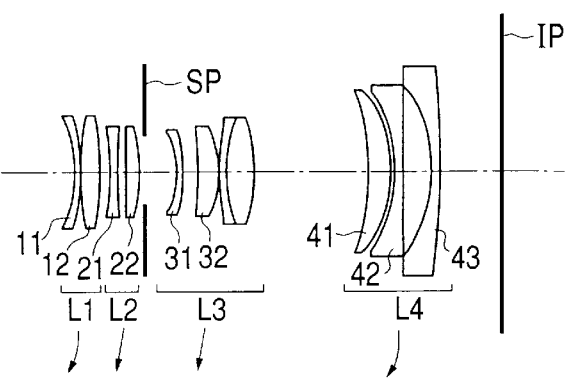
FIG. 1 is a sectional view of a zoom lens according to Numerical Example 1.
Figure 2A:
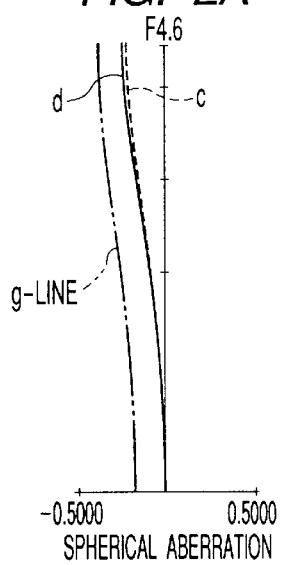
FIGS. 2A, 2B, 2C and 2D are diagrams showing aberrations at the wide-angle end of the zoom lens according to Numerical Example 1.
Figure 2B:
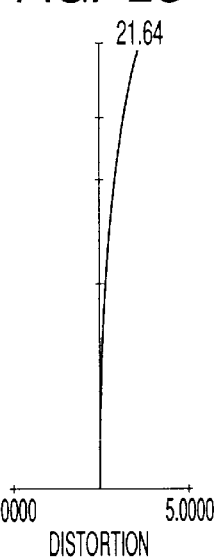
Figures 2C, 2D:
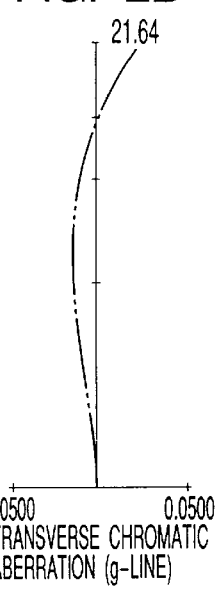
Figure 3A:
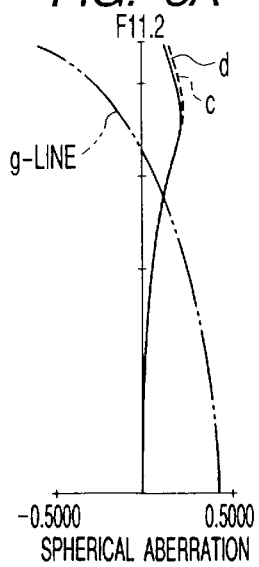
FIGS. 3A, 3B, 3C and 3D are diagrams showing aberrations at the telephoto end of the zoom lens according to Numerical Example 1.
Figure 3B:
Figures 3C, 3D:
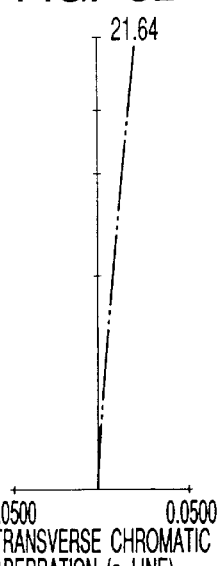

FIG. 1 is a sectional view of a zoom lens relating to Numerical Example 1 described below. FIGS. 2A to 2D and FIGS. 3A to 3D are diagrams showing aberrations at the wide-angle end and at the telephoto end, respectively, of the zoom lens relating to Numerical Example 1.

Figure 4:
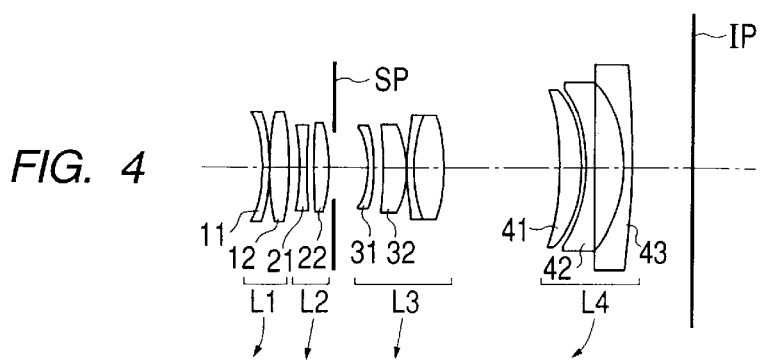
FIG. 4 is a sectional view of a zoom lens according to Numerical Example 2.
Figures 5A, 5B, 5C, 5D:
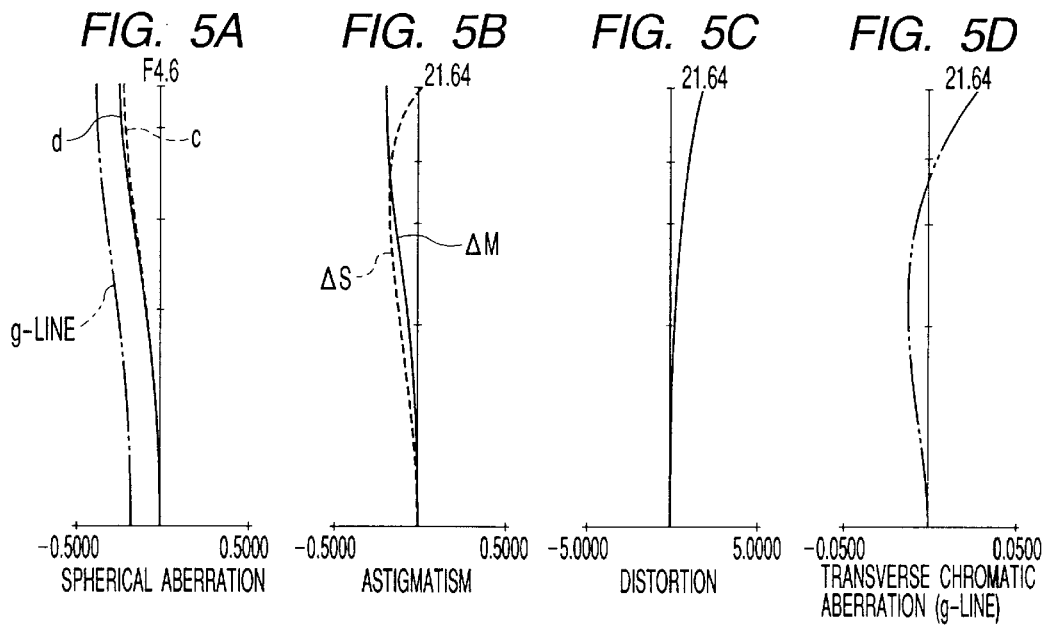
FIGS. 5A, 5B, 5C and 5D are diagrams showing aberrations at the wide-angle end of the zoom lens according to Numerical Example 2.
Figures 6A, 6B, 6C, 6D:
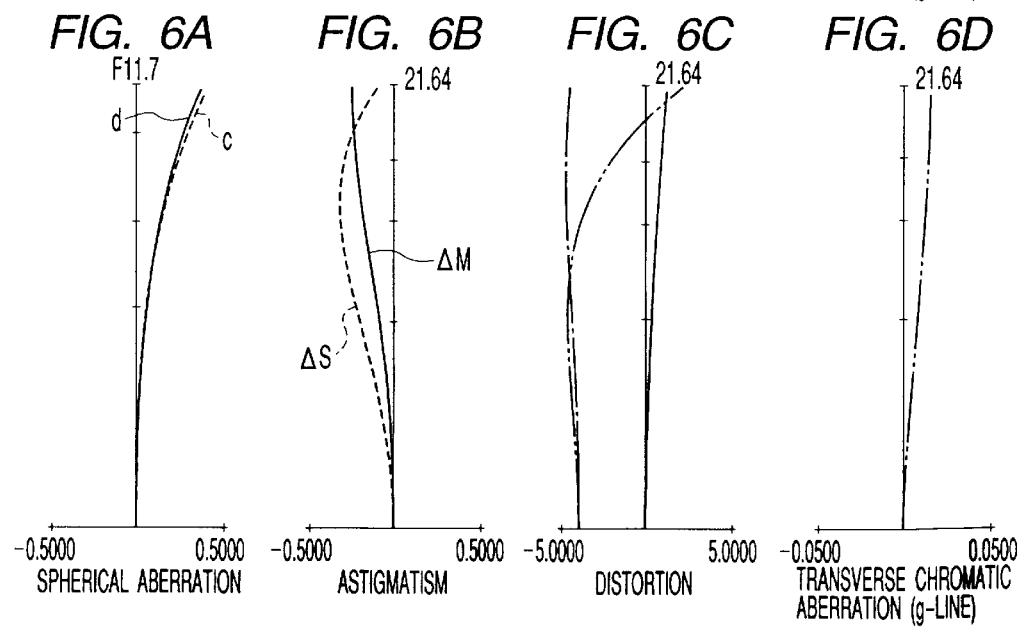
FIGS. 6A, 6B, 6C and 6D are diagrams showing aberrations at the telephoto end of the zoom lens according to Numerical Example 2.

FIG. 4 is a sectional view of a zoom lens relating to Numerical Example 2 described below. FIGS. 5A to 5D and FIGS. 6A to 6D are diagrams showing aberrations at the wide-angle end and at the telephoto end, respectively, of the zoom lens relating to Numerical Example 2.

Figure 7:
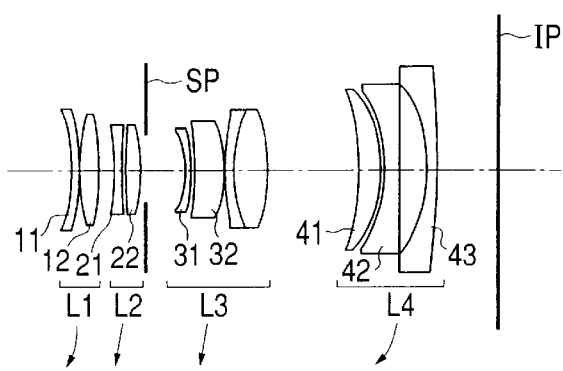
FIG. 7 is a sectional view of a zoom lens according to Numerical Example 3.
Figure 8A:
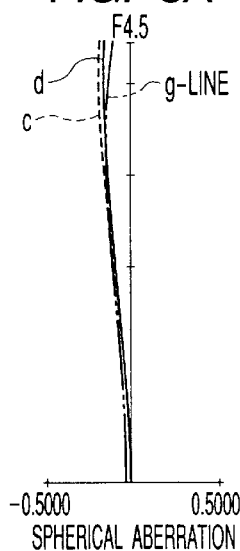
FIGS. 8A, 8B, 8C and 8D are diagrams showing aberrations at the wide-angle end of the zoom lens according to Numerical Example 3.
Figure 8B:
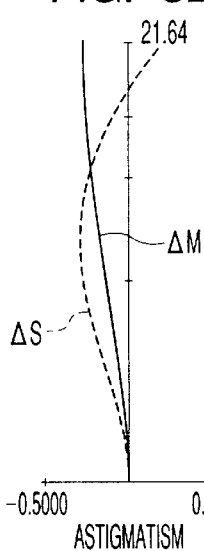
Figure 8C:
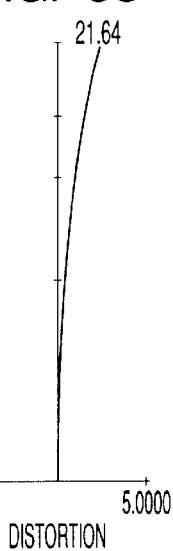
Figure 8D:
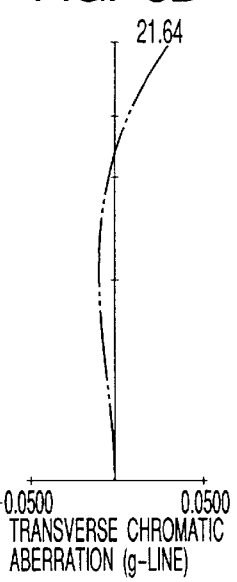
Figure 9A:
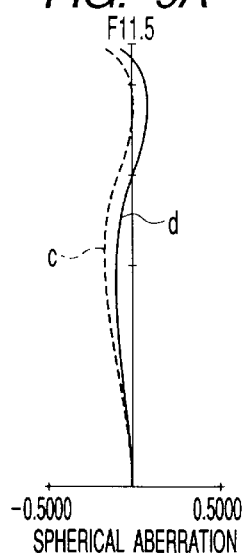
FIGS. 9A, 9B, 9C and 9D are diagrams showing aberrations at the telephoto end of the zoom lens according to Numerical Example 3.
Figure 9B:
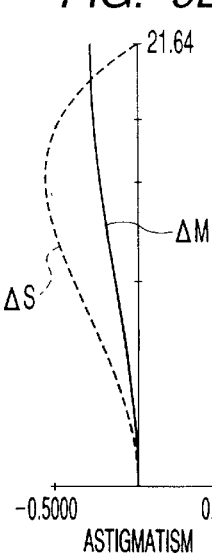
Figure 9C:
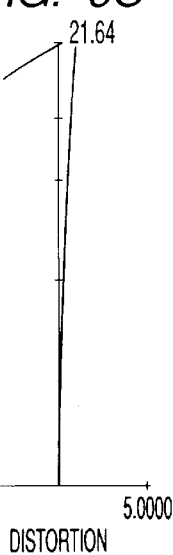
Figure 9D:
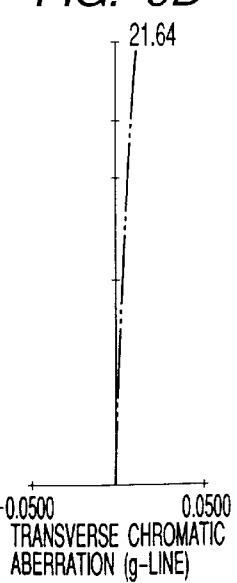

FIG. 7 is a sectional view of a zoom lens relating to Numerical Example 3 described below. FIGS. 8A to 8D and FIGS. 9A to 9D are diagrams showing aberrations at the wide-angle end and at the telephoto end, respectively, of the zoom lens relating to Numerical Example 3.

Figure 10:
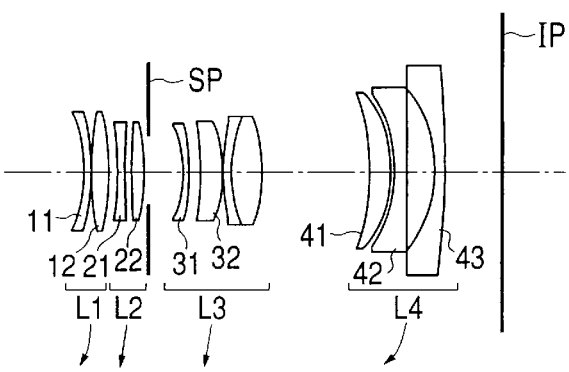
FIG. 10 is a sectional view of a zoom lens according to Numerical Example 4.
Figure 11A:
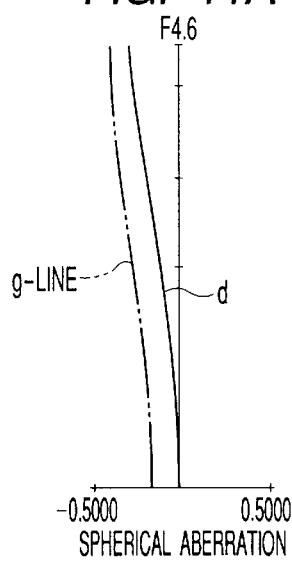
FIGS. 11A, 11B, 11C and 11D are diagrams showing aberrations at the wide-angle end of the zoom lens according to Numerical Example 4.
Figure 11B:
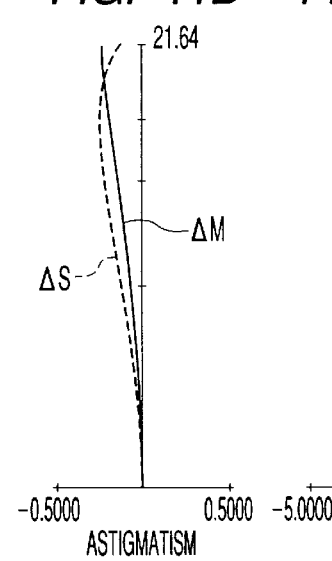
Figure 11C:
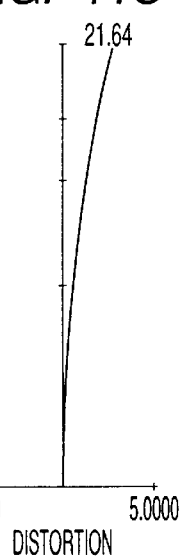
Figure 11D:
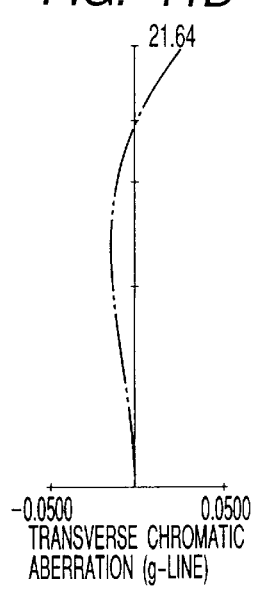
Figure 12A:
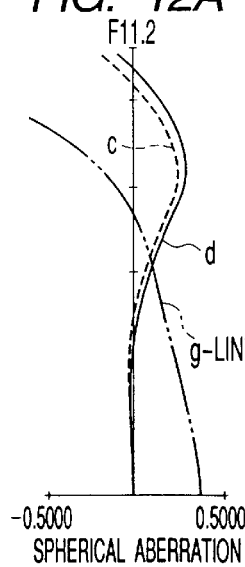
FIGS. 12A, 12B, 12C and 12D are diagrams showing aberrations at the telephoto end of the zoom lens according to Numerical Example 4.
Figure 12B:
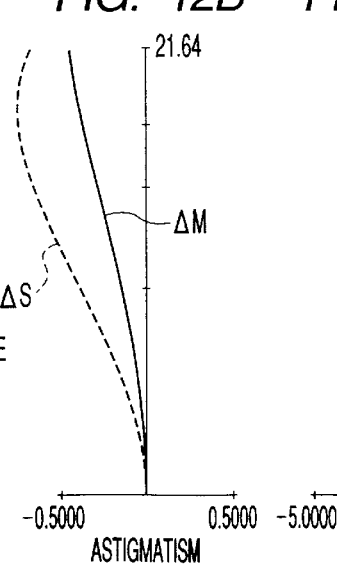
Figure 12C:
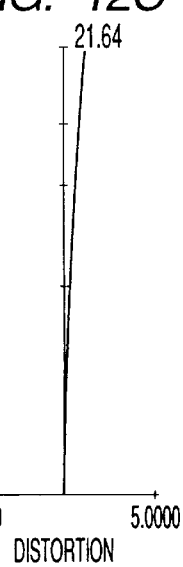
Figure 12D:
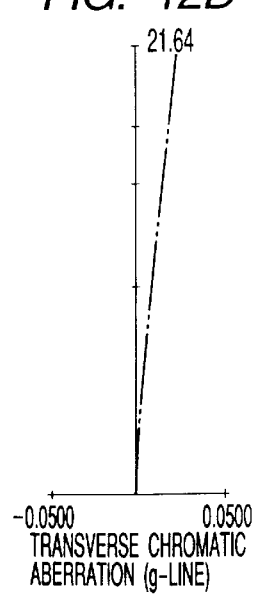

FIG. 10 is a sectional view of a zoom lens relating to Numerical Example 4 described below. FIGS. 11A to 11D and FIGS. 12A to 12D are diagrams showing aberrations at the wide-angle end and at the telephoto end, respectively, of the zoom lens relating to Numerical Example 4.

Figure 13:
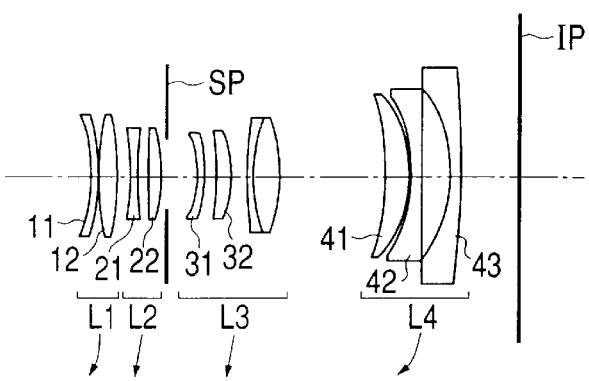
FIG. 13 is a sectional view of a zoom lens according to Numerical Example 5.
Figure 14A:
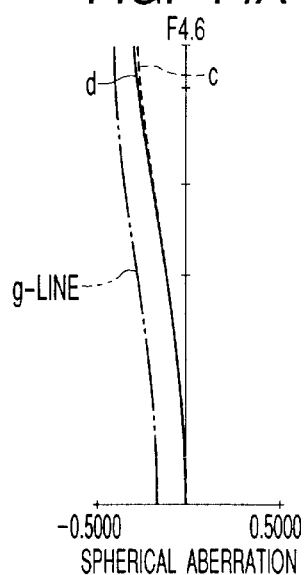
FIGS. 14A, 14B, 14C and 14D are diagrams showing aberrations at the wide-angle end of the zoom lens according to Numerical Example 5.
Figure 14B:
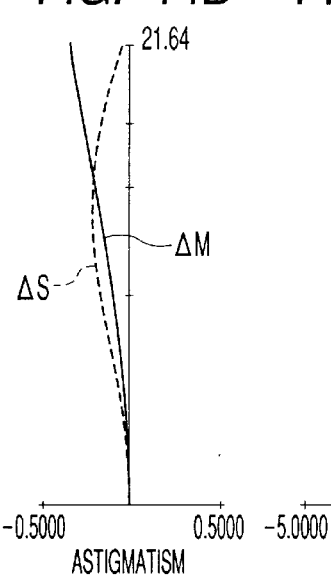
Figure 14C:
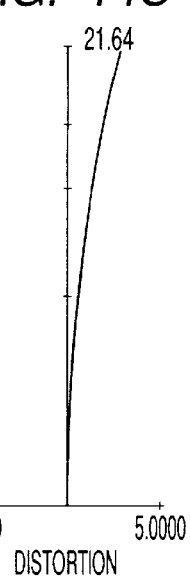
Figure 14D:
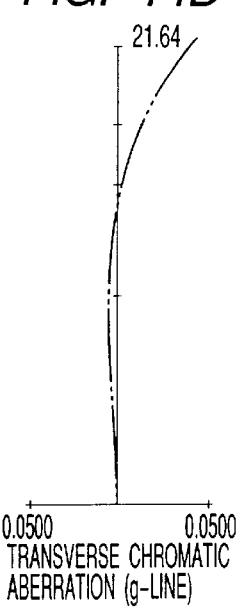
Figure 15A:
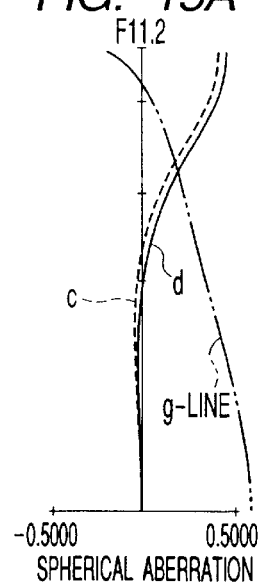
FIGS. 15A, 15B, 15C and 15D are diagrams showing aberrations at the telephoto end of the zoom lens according to Numerical Example 5.
Figure 15B:
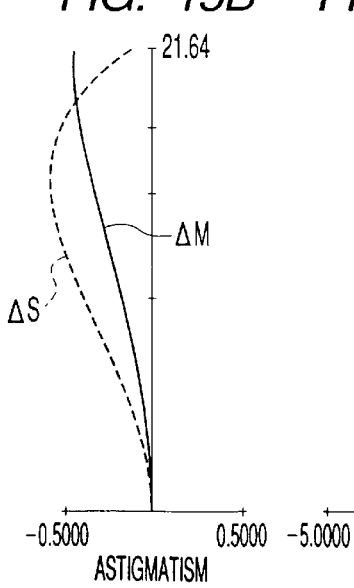
Figure 15C:
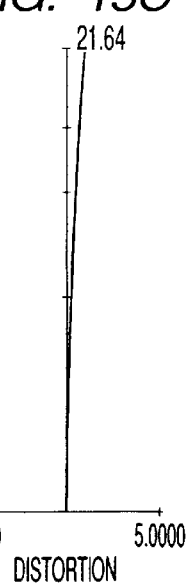
Figure 15D:
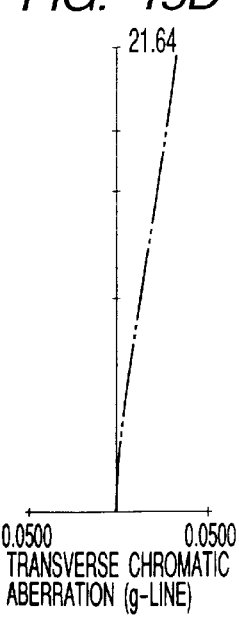

FIG. 13 is a sectional view of a zoom lens relating to Numerical Example 5 described below. FIGS. 14A to 14D and FIGS. 15A to 15D are diagrams showing aberrations at the wide-angle end and at the telephoto end, respectively, of the zoom lens relating to Numerical Example 5.

FIG. 16 is a sectional view of a zoom lens relating to Numerical Example 6 described below. FIGS. 17A to 17D and FIGS. 18A to 18D are diagrams showing aberrations at the wide-angle end and at the telephoto end, respectively, of the zoom lens relating to Numerical Example 6.

Each of the lens sectional views of FIGS. 1, 4, 7, 10, 13, and 16 illustrates a first lens unit L1 having a positive refractive power (optical power=reciprocal of focal length), a second lens unit L2 having a negative refractive power, a third lens unit L3 having a positive refractive power, and a fourth lens unit L4 having a negative refractive power. The arrows indicate the directions in which the lens units are respectively moved for magnifying power change from the wide-angle side to the telephoto side. Also, an aperture stop is indicated by SP, and an image plane is indicated by IP.

The magnifying power is changed by moving the lens units so that the axial air spacing between the first lens unit L1 and the second lens unit L2 at the telephoto end is larger than that at the wide-angle end, and so that the axial air spacing between the third lens unit L3 and the fourth lens unit L4 at the telephoto end is smaller than that at the wide-angle end.

The axial air spacing between the second lens unit L2 and the third lens unit L3 at the telephoto end is larger than that at the wide-angle end in zoom lenses shown in FIGS. 1, 4, 10, and 13 and corresponding to Numerical Examples 1, 2, 4, and 5, while the axial air spacing at the telephoto end is smaller than that at the wide-angle end in a zoom lens shown in FIG. 7 and corresponding to Numerical Example 3. The corresponding spacing is not changed in a zoom lens shown in FIG. 16 and corresponding to Numerical Example 6. The zoom lenses corresponding to Numerical Examples 1 to 5 are four-unit zoom lenses in which the four lens units are moved independently of each other at the time of magnifying power change.

In contract, in the zoom lens shown in FIG. 16 and corresponding to Numerical Example 6, the second lens unit L2 and the third lens unit L3 are moved integrally with each other at the time of power change. Therefore, this zoom lens may be handled as three-unit zoom lenses in terms of zoom type. The resultant refractive power of the second lens unit L2 and the third lens unit L3 is positive.

In this embodiment, the third lens unit L3 is moved to perform focusing in the above-described zoom lens constructions.

The method of focusing using the third lens unit is adopted to reduce the focusing unit in size and in weight.

The refractive power of the third lens unit L3 can be increased comparatively easily. Therefore, it is possible to reduce the distance by which the third lens unit L3 is moved forward in the case of focusing to an object at a close-up distance.

The first lens unit L1 is constituted of a negative meniscus lens 11 having a concave surface on the object side and a positive biconvex lens 12, the lenses 11 and 12 being placed in this order from the object side.

If the first lens unit L1 is formed in this way, spherical aberration caused by the first lens unit L1 having a positive refractive power can be suitably corrected. In particular, spherical aberration at the telephoto end can be corrected and distortion at the wide-angle end can be also corrected suitably.

The second lens unit L2 is constituted of a negative biconvex lens 21 and a positive lens 22 placed in this order from the object side, thereby enabling spherical aberration at the telephoto end to be suitably corrected. Also, chromatic aberration which becomes worse with the increase in variable magnifying power is effectively corrected thereby.

The third lens unit L3 formed as a focusing unit has a negative meniscus lens 31 having a concave surface on the object side, and a positive meniscus lens 32 having a convex surface on the image side, the lenses 31 and 32 being placed in this order from the object side. In the lens unit thus constructed, spherical aberration, which increases with the increase in variable magnifying power ratio, at the telephoto end is effectively corrected, thereby ensuring good optical performance in the entire variable magnifying power range.

In the third lens unit L3, an aspherical surface is also provided such that a positive refractive power decreases from a lens center to a lens peripheral portion.

To correct spherical aberration caused by the positive refractive power of the third lens unit L3, an aspherical surface is formed to provide a positive refractive power which decreases from a lens center to a lens peripheral portion. As a result, the spherical aberration caused by the third lens unit alone is reduced by some amount, thereby achieving good spherical aberration in the entire variable magnifying power range.

The fourth lens unit L4 is constituted of a positive lens 41, a negative lens 42, and a negative lens 42 being placed in this order from the object side.

Because the negative refractive power of the fourth lens unit L4 is comparatively strong, it is divided into two produced by using two negative lenses, thereby limiting various aberrations. Also, the positive lens is placed in the object-side outermost position to increase axial rays, so that spherical aberration at the telephoto end in particular can be effectively corrected. Therefore, this arrangement is preferable. Also, the negative lenses are placed on the image plane side of the positive lens to enable the lens in the image-plane-side outermost position to be reduced in lens diameter. The back focus is also reduced, thereby reducing the entire optical length. Therefore, this arrangement is preferable.

If the focal lengths of the first lens unit L1 and the fourth lens unit L4 are f1 and f4, respectively; the focal length at the wide-angle end and the focal length at the telephoto end of the entire system are fw and tf, respectively; the Abbe number of the material of the negative lens in the object-side outermost position in the third lens unit L3 is $\nu 3n$; and the Abbe number of the material of the positive meniscus lens closer to the object-side outermost position in the third lens unit L3 is $\nu 3p$, conditions expressed by:

$$0.2 < f1/ft < 0.5 \tag{a1}$$

$$-0.2 < |f4/ft| < -0.5 \tag{a2}$$

$$3.7 < f1/fw < 6.0 \tag{a3}$$

$$20 < \nu 3p - \nu 3n < 50 \tag{a4}$$

are satisfied.

In the second lens unit L2, if the radius of curvature of the lens surface on the object side and the radius of curvature of the lens surface on the image side of the negative lens 21 are R21n1 and R21n2, respectively, and if the radius of curvature of the lens surface on the object side and the radius of curvature of the lens surface on the image plane side of the positive lens 22 are R22n1 and R22n2, respectively, conditions expressed by $$-1 < (R21n1+R21n2)/(R21n1-R21n2) < 1 \tag{a5}$$

$$0.5 < (R22p1-R22p2)/(R22p1+R22p2) < 8 \tag{a6}$$

are satisfied.

If the Abbe numbers of the materials of the negative lens 21 and the positive lens 22 in the second lens unit L2 are $\nu 21n$ and $\nu 22p$, respectively, a condition expressed by $$20 < \nu 21n - \nu 22p < 40 \tag{a7}$$

is satisfied.

If the radius of curvature of the lens surface on the object side of the negative meniscus lens 31 in the object-side outermost position in the third lens unit L3 and the radius of curvature of the lens surface on the image plane side of this lens are R31n1 and R31n2, respectively, a condition expressed by $$-1 < (R31n1-R31n2)/(R31n1+R31n2) < 0 \tag{a8}$$

is satisfied.

If an aperture stop SP is provided between the second lens unit L2 and the third lens unit L3, and if the axial air spacing between the aperture stop SP and the third lens unit L3 at the telephoto end is Lp, a condition expressed by $$0.02 < Lpa/ft < 0.1 \tag{a9}$$

is satisfied.

If the focal length of the second lens unit L2 is f2, a condition expressed by $$0 < |ft/f2| < 0.5 \quad (a10)$$

is satisfied.

The technical meanings of the condition formulas shown above will be described.

The condition formula (a1) specifies the ratio of the focal length of the first lens unit L1 and the focal length of the entire system at the telephoto end mainly to reduce the size of the lens system and to improve the performance of the lens system.

If the lower limit value of the condition formula (a1) is exceeded, the refractive power of the first lens unit L1 becomes excessively large and it is difficult to correct spherical aberration at the telephoto end in particular. Therefore, a setting beyond this limit is undesirable. If the upper limit value is exceeded, the refractive power of the first lens unit L1 becomes excessively small and the magnifying power change burden on the final lens unit having a negative refractive power is increased, so that it is difficult to obtain a sufficiently high variable magnifying power. The entire length of the lens system is also increased. Therefore, a setting beyond this limit is undesirable.

Preferably, to achieve both a reduction in size and an improvement in performance, it is desirable to set the lower limit of the condition formula (a1) to 0.3 and to set the upper limit to 0.4.

The condition formula (a2) specifies the ratio of the focal length of the final lens unit (fourth lens unit L4) having a negative refractive power and the focal length of the entire system at the telephoto end mainly to reduce the size of the lens system and to improve the performance of the lens system.

If the lower limit value of the condition formula (a2) is exceeded, the refractive power of the final lens unit becomes excessively small and the amount of movement of the final lens unit at the time of magnifying power change is increased, resulting in an increase in the optical length at the telephoto end. Therefore, a setting beyond this limit is undesirable. If the upper limit value is exceeded, the refractive power of the final lens unit becomes excessively large and it is difficult to correct distortion at the wide-angle end in particular. Also, image plane characteristics become deteriorated. Therefore, a setting beyond this limit is undesirable.

Preferably, to achieve both a reduction in size and an improvement in performance, it is desirable to set the lower limit of the condition formula (a2) to −0.16 and to set the upper limit to −0.1.

The condition formula (a3) specifies the ratio of the focal length of the entire system at the wide-angle end and the focal length of the entire system at the telephoto end to set a suitable variable magnifying power ratio.

If the lower limit value of the condition formula (a3) is exceeded, it is difficult to achieve a high variable magnifying power, which corresponds to one of the objects of the present invention. Therefore, a setting beyond this limit is undesirable. If the upper limit value is exceeded, the variable magnifying power ratio is excessively high and it is difficult to obtain high optical performance. Therefore, a setting beyond this limit is undesirable.

It is more preferable to set the upper limit of the condition formula (a3) to 5.0.

The condition formula (a4) specifies the difference between the Abbe numbers of the materials of the negative lens and the positive lens in the focusing lens unit, i.e., the third lens unit, mainly to correct chromatic aberration.

If the lower limit value of the condition formula (a4) is exceeded, undercorrection of longitudinal chromatic aberration caused by the third lens unit having a positive refractive power results and longitudinal chromatic aberration at the wide-angle end in particular tends to be "under". It is difficult to suitably correct the aberration. Therefore, a setting beyond this limit is undesirable. If the upper limit value is exceeded, overcorrection of longitudinal chromatic aberration caused by the third lens unit having a positive refractive power results and longitudinal chromatic aberration at the telephoto end in particular tends to be "over". It is difficult to suitably correct the aberration. Therefore, a setting beyond this limit is undesirable.

It is more preferable to set the lower limit of the condition formula (a4) to 30 and to set the upper limit to 35.

The condition formula (a5) is provided to make a suitable geometrical setting of the negative lens 21 in the second lens unit L2.

If the lower limit value of the condition formula (a5) is exceeded, the radius of curvature of the lens surface on the object side of the negative lens 21 is relatively reduced excessively and overcorrection of spherical aberration at the telephoto end in particular results. Therefore, a setting beyond this limit is undesirable. If the upper limit value is exceeded, the radius of curvature of the lens surface on the image plane side of the negative lens 21 is relatively reduced excessively and it is difficult to correct distortion at the wide-angle end in particular. Therefore, a setting beyond this limit is undesirable.

It is more preferable to set the lower limit of the condition formula (a5) to −0.7 and to set the upper limit to 0.3.

The condition formula (a6) is provided to make a suitable geometrical setting of the positive lens 22 in the second lens unit L2.

If the lower limit value of the condition formula (a6) is exceeded, the radius of curvature of the lens surface on the object side of the positive lens 22 is relatively increased excessively and comatic aberration at the wide-angle end in particular becomes worse. Therefore, a setting beyond this limit is undesirable. If the upper limit value is exceeded, comatic aberration at the telephoto end in particular becomes worse. Therefore, a setting beyond this limit is undesirable.

It is more preferable to set the lower limit of the condition formula (a6) to 0.8 and to set the upper limit to 5.0.

The condition formula (a7) specifies the difference between the Abbe numbers of the negative lens 21 and the positive lens 22 in the second lens unit L2 mainly to correct longitudinal chromatic aberration and transverse chromatic aberration.

If the lower limit value of the condition formula (a7) is exceeded, undercorrection of longitudinal chromatic aberration at the telephoto end in particular results, this aberration tends to increase in the plus direction, and transverse chromatic aberration at the wide-angle end increases in the minus direction. Therefore, a setting beyond this limit is undesirable. If the upper limit value is exceeded, undercorrection of longitudinal chromatic aberration at the wide-angle end results, this aberration tends to increase in the minus direction, and transverse chromatic aberration at the telephoto end increases in the plus direction. Therefore, a setting beyond this limit is undesirable.

To achieve the desired balance between longitudinal chromatic aberration and transverse chromatic aberration, it is desirable to set the lower limit of the condition formula (a7) to 22 and to set the upper limit to 30.

The condition formula (a8) is provided to make a suitable geometrical setting of the negative lens 31 in the object-side outermost position in the third lens unit L3.

If the lower limit value of the condition formula (a8) is exceeded, the meniscus shape becomes excessively steep and it is difficult to manufacture the lens. Also, overcorrection of spherical aberration at the telephoto end in particular results and this aberration increases in the plus direction. Therefore, a setting beyond this limit is undesirable. If the upper limit value is exceeded, the refractive power of the negative lens 31 is excessively small, undercorrection of spherical aberration at the telephoto end in particular results, and this aberration increases in the minus direction. Also, comatic aberration at the wide-angle end becomes worse. Therefore, a setting beyond this limit is undesirable.

It is more preferable to set the lower limit of the condition formula (a8) to −0.6 and to set the upper limit to −0.1.

In this embodiment, the aperture stop SP is provided between the second lens unit L2 and the third lens unit L3 by considering the balance between the front lens diameter and the rear lens diameter. If the aperture stop SP is placed between the first lens unit L1 and the second lens unit L2, the rear lens diameter is increased, resulting in an increase in overall size of the camera. Therefore, this placement is undesirable. If the aperture stop SP is placed between the third lens unit L3 and the fourth lens unit L4, the front lens diameter is increased to such an extent that it is difficult to place a barrier mechanism in the lens barrel. Therefore, the placement of the aperture stop SP at this position is undesirable.

The condition formula (a9) specifies the distance between the aperture stop SP and the third lens unit L3 to reduce the lens diameter and to avoid interference between the third lens unit L3 and the stop when the third lens unit L3 operated as a focusing unit is moved forward for focusing to an object at a close-up distance.

If the lower limit value of the condition formula (a9) is exceeded, the distance between the aperture stop SP and the third lens unit L3 becomes excessively small and the third lens unit L3 interferes with the stop when the third lens unit L3 is moved forward for focusing to an object at a close-up distance, so that photography at a sufficiently small close-up distance cannot be ensured. Therefore, a setting beyond this limit is undesirable. If the upper limit value is exceeded, the stop is positioned closer to the object-side end of the zoom lens at the telephoto end, so that the stop diameter is increased, resulting in an increase in lens barrel diameter. Therefore, a setting beyond this limit is undesirable.

It is more preferable to set the upper limit of the condition formula (a9) to 0.05.

The condition formula (a10) specifies the refractive power of the second lens unit L2.

If the upper limit value of the condition formula (a10) is exceeded, the refractive power of the second lens unit L2 becomes large and the refractive power of the third lens unit L3 also becomes large, so that variation in spherical aberration with respect to the movement for focusing is increased. Therefore, a setting beyond this limit is undesirable.

It is more preferable to set the upper limit of the condition formula (a10) to 0.4.

In each of the zoom lenses corresponding to the numerical examples, the aperture stop SP is moved integrally with the second lens unit L2 during zooming. Alternatively, the aperture stop SP and the second lens unit L2 may be moved separately from each other.

One of the lens units or an element in one lens unit may be shifted in a direction approximately perpendicular to the optical axis to make a camera shake correction.

To simplify the mechanical structure, the lens system may be arranged so that the first lens unit and the fourth lens unit are moved integrally with each other during zooming.

Numerical data in the Numerical Examples 1 to 6 is shown below. Number i represents ordinal numbers designating the positions of the surfaces from the object side. Ri represents the radius of curvature of each surface, Di represents the member thicknesses or air spacing corresponding to the ith and (i+1)th surfaces, and Ni and ν i represent the refractive index and the Abbe number of the material of the ith optical member with respect to the d-line. The shape of the aspherical surface is expressed by an equation:

$$X = (1/R)Y^2 / [1 + \{1 - (1+K)(Y/R)^2\}^{1/2}] + BY^4 + CY^6 + DY^8 + EY^{10} + FY^{12}$$

wherein R is the radius of curvature of a central portion of the lens surface, X is the change in position along the optical axis with reference to the surface vertex, Y is the distance in a direction perpendicular to the optical axis, and each of K, B, C, D, E and F is an coefficient of aspheric.

Also, "e-X" denotes "x $10^{-x}$".

Table 1 shows the relationship between the condition formulas shown above and the numerical examples.

Numerical Example 1 f = 38.8 − 150.4   Fno = 4.6 − 11.2   2ω = 58.3 − 16.4

| | | | | | | | |
|---|---|---|---|---|---|---|---|
| R 1 = | −21.121 | D 1 = | 0.90 | N 1 = | 1.846660 | ν 1 = | 23.9 |
| R 2 = | −29.095 | D 2 = | 0.12 | | | | |
| R 3 = | 34.993 | D 3 = | 2.60 | N 2 = | 1.487490 | ν 2 = | 70.2 |
| R 4 = | −34.993 | D 4 = | Variable | | | | |
| R 5 = | −28.386 | D 5 = | 1.00 | N 3 = | 1.772499 | ν 3 = | 49.6 |
| R 6 = | 67.752 | D 6 = | 0.89 | | | | |
| R 7 = | 305.983 | D 7 = | 1.70 | N 4 = | 1.805181 | ν 4 = | 25.4 |
| R 8 = | −25.451 | D 8 = | 0.50 | | | | |
| R 9 = | Aperture Stop | D 9 = | Variable | | | | |
| R10 = | −12.495 | D10 = | 0.80 | N 5 = | 1.834000 | ν 5 = | 37.2 |
| R11 = | −21.729 | D11 = | 1.96 | | | | |
| R12 = | −48.167 | D12 = | 2.46 | N 6 = | 1.487490 | ν 6 = | 70.2 |
| R13 = | −17.117 | D13 = | 0.18 | | | | |
| R14 = | 50.923 | D14 = | 0.90 | N 7 = | 1.846660 | ν 7 = | 23.9 |
| R15 = | 21.439 | D15 = | 3.80 | N 8 = | 1.583126 | ν 8 = | 59.4 |
| *R16 = | −22.089 | D16 = | Variable | | | | |
| R17 = | −39.736 | D17 = | 2.80 | N 9 = | 1.846660 | ν 9 = | 23.9 |
| R18 = | −19.114 | D18 = | 0.51 | | | | |
| R19 = | −20.723 | D19 = | 1.30 | N10 = | 1.772499 | ν10 = | 49.6 |

-continued

| | | | | | | | |
|---|---|---|---|---|---|---|---|
| R20 = | 1,078.462 | D20 = | 3.86 | | | | |
| R21 = | −19.439 | D21 = | 1.45 | N11 = | 1.772499 | ν11 = | 49.6 |
| R22 = | −112.388 | | | | | | |

| | Focal Length | | |
|---|---|---|---|
| Variable Interval | 38.8 | 61.1 | 150.4 |
| D 4 | 1.35 | 4.94 | 13.07 |
| D 9 | 4.36 | 4.41 | 4.84 |
| D16 | 14.40 | 9.18 | 2.09 |

Coefficient of Aspheric
The 16th surface:

K = 0.00000e+00
B = 1.09309e−05
C = 1.01988e−07
D = −8.56331e−10
E = 0.00000e+00
F = 0.00000e+00

Numerical Example 2
f = 38.9 − 150.4   Fno = 4.6 − 11.7   2ω = 58.2 − 16.4

| | | | | | | | |
|---|---|---|---|---|---|---|---|
| R 1 = | −20.851 | D 1 = | 0.90 | N 1 = | 1.846660 | ν 1 = | 23.8 |
| R 2 = | −28.711 | D 2 = | 0.12 | | | | |
| R 3 = | 37.815 | D 3 = | 2.40 | N 2 = | 1.487490 | ν 2 = | 70.2 |
| R 4 = | −33.376 | D 4 = | Variable | | | | |
| R 5 = | −25.829 | D 5 = | 1.04 | N 3 = | 1.772499 | ν 3 = | 49.6 |
| R 6 = | 58.994 | D 6 = | 0.81 | | | | |
| R 7 = | 127.773 | D 7 = | 2.40 | N 4 = | 1.761821 | ν 4 = | 26.5 |
| R 8 = | −23.911 | D 8 = | 0.50 | | | | |
| R 9 = | Aperture Stop | D 9 = | Variable | | | | |
| R10 = | −12.669 | D10 = | 0.70 | N 5 = | 1.800999 | ν 5 = | 35.0 |
| R11 = | −21.686 | D11 = | 1.32 | | | | |
| R12 = | −41.245 | D12 = | 2.73 | N 6 = | 1.487490 | ν 6 = | 70.2 |
| R13 = | −18.638 | D13 = | 0.12 | | | | |
| R14 = | 56.477 | D14 = | 0.90 | N 7 = | 1.846659 | ν 7 = | 23.8 |
| R15 = | 23.042 | D15 = | 4.37 | N 8 = | 1.583126 | ν 8 = | 59.4 |
| *R16 = | −19.861 | D16 = | Variable | | | | |
| R17 = | −41.762 | D17 = | 2.90 | N 9 = | 1.846660 | ν 9 = | 23.8 |
| R18 = | −20.565 | D18 = | 0.59 | | | | |
| R19 = | −22.536 | D19 = | 1.30 | N10 = | 1.772499 | ν10 = | 49.6 |
| R20 = | 584.277 | D20 = | 3.85 | | | | |
| R21 = | −20.418 | D21 = | 1.50 | N11 = | 1.772499 | ν11 = | 49.6 |
| R22 = | −144.439 | | | | | | |

| | Focal Length | | |
|---|---|---|---|
| Variable Interval | 38.9 | 66.1 | 150.4 |
| D 4 | 1.29 | 5.91 | 13.40 |
| D 9 | 4.71 | 5.34 | 4.91 |
| D16 | 15.13 | 8.99 | 2.64 |

Coefficient of Aspheric
The 16th surface:

K = 0.00000e+00
B = 1.43847e−05
C = 5.31788e−08
D = −1.14246e−10
E = 0.00000e+00
F = 0.00000e+00

Numerical Example 3
f = 39.1 − 145.5   Fno = 4.5 − 11.5   2ω = 58.0 − 16.9

| | | | | | | | |
|---|---|---|---|---|---|---|---|
| R 1 = | −22.666 | D 1 = | 0.90 | N 1 = | 1.728250 | ν 1 = | 28.5 |
| R 2 = | −40.682 | D 2 = | 0.15 | | | | |
| R 3 = | 27.758 | D 3 = | 2.40 | N 2 = | 1.487490 | ν 2 = | 70.2 |
| R 4 = | −35.531 | D 4 = | Variable | | | | |

-continued

| | | | | | | | |
|---|---|---|---|---|---|---|---|
| R 5 = | −48.398 | D 5 = | 0.80 | N 3 = | 1.677900 | ν 3 = | 55.3 |
| R 6 = | 32.421 | D 6 = | 0.88 | | | | |
| R 7 = | 66.104 | D 7 = | 1.90 | N 4 = | 1.805181 | ν 4 = | 25.4 |
| R 8 = | −41.927 | D 8 = | 0.70 | | | | |
| R 9 = | Aperture Stop | D 9 = | Variable | | | | |
| R10 = | −11.581 | D10 = | 0.80 | N 5 = | 1.612929 | ν 5 = | 37.0 |
| R11 = | −26.656 | D11 = | 0.46 | | | | |
| R12 = | −47.383 | D12 = | 3.98 | N 6 = | 1.487490 | ν 6 = | 70.2 |
| R13 = | −18.841 | D13 = | 0.17 | | | | |
| R14 = | 38.372 | D14 = | 0.90 | N 7 = | 1.846659 | ν 7 = | 23.8 |
| R15 = | 17.441 | D15 = | 4.89 | N 8 = | 1.583126 | ν 8 = | 59.4 |
| *R16 = | −19.145 | D16 = | Variable | | | | |
| R17 = | −43.969 | D17 = | 2.90 | N 9 = | 1.846660 | ν 9 = | 23.8 |
| R18 = | −17.596 | D18 = | 0.50 | | | | |
| R19 = | −17.616 | D19 = | 1.30 | N10 = | 1.772499 | ν10 = | 49.6 |
| R20 = | 147.214 | D20 = | 4.17 | | | | |
| R21 = | −20.882 | D21 = | 1.50 | N11 = | 1.772499 | ν11 = | 49.6 |
| R22 = | −82.552 | | | | | | |

| | Focal Length | | |
|---|---|---|---|
| Variable Interval | 39.1 | 68.0 | 145.5 |
| D 4 | 2.10 | 5.47 | 9.82 |
| D 9 | 5.26 | 4.45 | 4.65 |
| D16 | 12.18 | 6.37 | 1.43 |

Coefficient of Aspheric
The 16th surface:

K = 0.00000e+00
B = 1.36544e−05
C = 1.98925e−07
D = −1.70383e−09
E = 0.00000e+00
F = 0.00000e+00

Numerical Example 4
f = 38.5 − 160.0  Fno = 4.6 − 11.2  2ω = 58.6 − 15.4

| | | | | | | | |
|---|---|---|---|---|---|---|---|
| R 1 = | −21.129 | D 1 = | 0.90 | N 1 = | 1.846660 | ν 1 = | 23.9 |
| R 2 = | −29.836 | D 2 = | 0.20 | | | | |
| R 3 = | 36.545 | D 3 = | 2.60 | N 2 = | 1.487490 | ν 2 = | 70.2 |
| R 4 = | −32.427 | D 4 = | Variable | | | | |
| R 5 = | −27.549 | D 5 = | 1.00 | N 3 = | 1.772499 | ν 3 = | 49.6 |
| R 6 = | 79.016 | D 6 = | 0.89 | | | | |
| R 7 = | 250.253 | D 7 = | 1.74 | N 4 = | 1.805181 | ν 4 = | 25.4 |
| R 8 = | −26.520 | D 8 = | 0.50 | | | | |
| R 9 = | Aperture Stop | D 9 = | Variable | | | | |
| R10 = | −12.424 | D10 = | 0.80 | N 5 = | 1.834000 | ν 5 = | 37.2 |
| R11 = | −21.309 | D11 = | 1.54 | | | | |
| R12 = | −46.289 | D12 = | 2.70 | N 6 = | 1.487490 | ν 6 = | 70.2 |
| R13 = | −17.120 | D13 = | 0.33 | | | | |
| R14 = | 51.781 | D14 = | 0.90 | N 7 = | 1.846660 | ν 7 = | 23.9 |
| R15 = | 21.660 | D15 = | 3.56 | N 8 = | 1.583126 | ν 8 = | 59.4 |
| *R16 = | −21.769 | D16 = | Variable | | | | |
| R17 = | −41.533 | D17 = | 2.80 | N 9 = | 1.846660 | ν 9 = | 23.9 |
| R18 = | −18.999 | D18 = | 0.51 | | | | |
| R19 = | −20.655 | D19 = | 1.30 | N10 = | 1.772499 | ν10 = | 49.6 |
| R20 = | 1,124.867 | D20 = | 3.97 | | | | |
| R21 = | −18.565 | D21 = | 1.45 | N11 = | 1.772499 | ν11 = | 49.6 |
| R22 = | −119.556 | | | | | | |

| | Focal Length | | |
|---|---|---|---|
| Variable Interval | 38.5 | 63.1 | 160.0 |
| D 4 | 0.91 | 4.49 | 11.14 |
| D 9 | 4.76 | 5.06 | 5.47 |
| D16 | 14.31 | 8.84 | 2.33 |

Coefficient of Aspheric
The 16th surface:

K = 0.00000e+00
B = 1.06972e−05

-continued

| | |
|---|---|
| C = | 1.66586e−07 |
| D = | −4.32087e−09 |
| E = | 5.24370e−11 |
| F = | 0.00000e+00 |

Numerical Example 5
f = 38.0 − 170.4  Fno = 4.6 − 12.0  2ω = 59.3 − 14.5

| | | | | | | | |
|---|---|---|---|---|---|---|---|
| R 1 = | −22.251 | D 1 = | 0.90 | N 1 = | 1.846660 | ν 1 = | 23.9 |
| R 2 = | −30.540 | D 2 = | 0.12 | | | | |
| R 3 = | 35.958 | D 3 = | 2.55 | N 2 = | 1.487490 | ν 2 = | 70.2 |
| R 4 = | −38.566 | D 4 = | Variable | | | | |
| R 5 = | −31.593 | D 5 = | 1.00 | N 3 = | 1.772499 | ν 3 = | 49.6 |
| R 6 = | 54.129 | D 6 = | 1.17 | | | | |
| R 7 = | 132.695 | D 7 = | 1.69 | N 4 = | 1.805181 | ν 4 = | 25.4 |
| R 8 = | −28.514 | D 8 = | 0.70 | | | | |
| R 9 = | Aperture Stop | D 9 = | Variable | | | | |
| R10 = | −11.487 | D10 = | 0.80 | N 5 = | 1.834000 | ν 5 = | 37.2 |
| R11 = | −19.130 | D11 = | 1.34 | | | | |
| R12 = | −43.006 | D12 = | 1.82 | N 6 = | 1.487490 | ν 6 = | 70.2 |
| R13 = | −14.894 | D13 = | 1.74 | | | | |
| R14 = | 50.573 | D14 = | 0.80 | N 7 = | 1.846660 | ν 7 = | 23.9 |
| R15 = | 20.423 | D15 = | 3.76 | N 8 = | 1.583126 | ν 8 = | 59.4 |
| *R16 = | −21.193 | D16 = | Variable | | | | |
| R17 = | −43.267 | D17 = | 2.80 | N 9 = | 1.846660 | ν 9 = | 23.9 |
| R18 = | −18.932 | D18 = | 0.30 | | | | |
| R19 = | −21.381 | D19 = | 1.30 | N10 = | 1.772499 | ν10 = | 49.6 |
| R20 = | 219.988 | D20 = | 4.12 | | | | |
| R21 = | −17.660 | D21 = | 1.45 | N11 = | 1.772499 | ν11 = | 49.6 |
| R22 = | −102.250 | | | | | | |

| | Focal Length | | |
|---|---|---|---|
| Variable Interval | 38.0 | 56.1 | 170.4 |
| D 4 | 1.59 | 4.77 | 16.16 |
| D 9 | 4.35 | 4.65 | 5.15 |
| D16 | 13.13 | 8.94 | 0.92 |

Coefficient of Aspheric
The 16th surface:

| | |
|---|---|
| K = | 0.00000e+00 |
| B = | 1.13481e−05 |
| C = | 1.48962e−07 |
| D = | −1.12879e−09 |
| E = | −1.69994e−12 |
| F = | 0.00000e+00 |

Numerical Example 6
f = 36.0 − 150.0  Fno = 4.6 − 11.5  2ω = 62.0 − 16.4

| | | | | | | | |
|---|---|---|---|---|---|---|---|
| R 1 = | −21.392 | D 1 = | 0.90 | N 1 = | 1.846660 | ν 1 = | 23.9 |
| R 2 = | −30.521 | D 2 = | 0.12 | | | | |
| R 3 = | 37.279 | D 3 = | 2.70 | N 2 = | 1.516330 | ν 2 = | 64.1 |
| R 4 = | −34.218 | D 4 = | Variable | | | | |
| R 5 = | −27.759 | D 5 = | 1.00 | N 3 = | 1.772499 | ν 3 = | 49.6 |
| R 6 = | 84.016 | D 6 = | 0.91 | | | | |
| R 7 = | 244.663 | D 7 = | 1.68 | N 4 = | 1.805181 | ν 4 = | 25.4 |
| R 8 = | −27.145 | D 8 = | 0.50 | | | | |
| R 9 = | Aperture Stop | D 9 = | 4.70 | | | | |
| R10 = | −12.534 | D10 = | 0.80 | N 5 = | 1.834000 | ν 5 = | 37.2 |
| R11 = | −24.703 | D11 = | 1.43 | | | | |
| R12 = | −56.200 | D12 = | 2.91 | N 6 = | 1.487490 | ν 6 = | 70.2 |
| R13 = | −16.804 | D13 = | 0.22 | | | | |
| R14 = | 44.864 | D14 = | 0.90 | N 7 = | 1.846660 | ν 7 = | 23.9 |
| R15 = | 21.162 | D15 = | 3.80 | N 8 = | 1.583126 | ν 8 = | 59.4 |
| *R16 = | −20.758 | D16 = | Variable | | | | |
| R17 = | −41.439 | D17 = | 2.80 | N 9 = | 1.846660 | ν 9 = | 23.9 |
| R18 = | −19.755 | D18 = | 0.51 | | | | |

-continued

| | | | | | | | |
|---|---|---|---|---|---|---|---|
| R19 = | −21.703 | D19 = | 1.30 | N10 = | 1.772499 | v10 = | 49.6 |
| R20 = | 878.446 | D20 = | 3.71 | | | | |
| R21 = | −20.367 | D21 = | 1.45 | N11 = | 1.772499 | v11 = | 49.6 |
| R22 = | −229.101 | | | | | | |

| | Focal Length | | |
|---|---|---|---|
| Variable Interval | 36.0 | 58.1 | 150.0 |
| D 4 | 0.54 | 5.12 | 13.39 |
| D16 | 13.27 | 7.88 | 0.91 |

Coefficient of Aspheric
The 16th surface:

K = 0.00000e+00
A = 0
B = 1.68502e−05
C = 1.90134e−07
D = −2.70365e−09
E = 1.91024e−11
F = 0.00000e+00

TABLE 1

| | Numerical Example | | | | | |
|---|---|---|---|---|---|---|
| Condition Formula | 1 | 2 | 3 | 4 | 5 | 6 |
| (a1) f1/ft | 0.37 | 0.38 | 0.39 | 0.35 | 0.35 | 0.37 |
| (a2) f4/ft | −0.13 | −0.14 | −0.14 | −0.12 | −0.11 | −0.13 |
| (a3) ft/fw | 3.88 | 3.87 | 3.72 | 4.15 | 4.48 | 4.17 |
| (a4) ν 3p−ν 3n | 33.1 | 35.3 | 33.2 | 33.1 | 33.1 | 33.1 |
| (a5) (R21n1+R21n2)/(R21n1−R21n2) | −0.41 | −0.39 | 0.20 | −0.48 | −0.26 | −0.50 |
| (a6) (R21p1−R21p2)/(R21p1+R21p2) | 1.18 | 1.46 | 4.47 | 1.24 | 1.55 | 1.25 |
| (a7) ν21n−ν21p | 24.2 | 23.1 | 29.9 | 24.2 | 24.2 | 24.2 |
| (a8) (R22n1−R22n2)/(R22n1+R22n2) | −0.27 | −0.26 | −0.39 | −0.26 | −0.25 | −0.33 |
| (a9) Lpa/ft | 0.032 | 0.033 | 0.032 | 0.034 | 0.03 | 0.031 |
| (a10) |ft/f2| | 0.26 | 0.27 | 0.30 | 0.27 | 0.29 | 0.25 |

According to the above-described embodiment, a high-variable-magnifying power zoom lens can be realized which has high optical performance over the entire variable magnifying power range, a comparatively short back focus, a reduced entire optical length, and a variable magnifying power ratio of 4 to 5.

Embodiment 2

FIG. 19 is a sectional view of a zoom lens relating to Numerical Example 7, showing a state at the wide-angle end. FIGS. 20A to 20D and FIGS. 21A to 21D are diagrams showing aberrations at the wide-angle end and at the telephoto end, respectively, of the zoom lens relating to Numerical Example 7.

Figure 22:
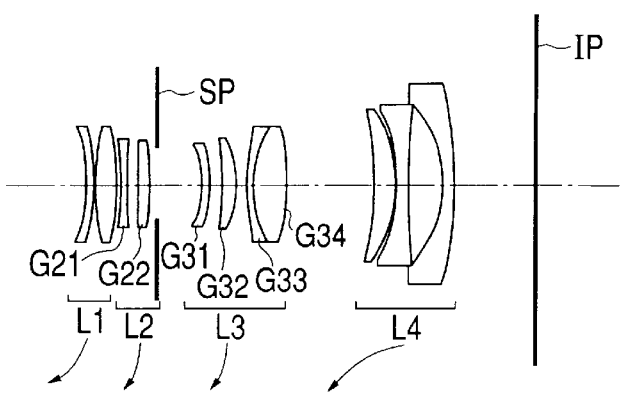
FIG. 22 is a sectional view of a zoom lens according to Numerical Example 8.
Figure 23A:
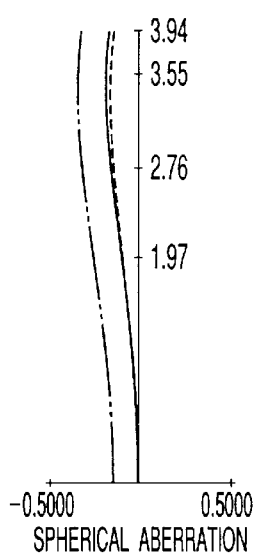
FIGS. 23A, 23B, 23C and 23D are diagrams showing aberrations at the wide-angle end of the zoom lens according to Numerical Example 8.
Figure 23B:
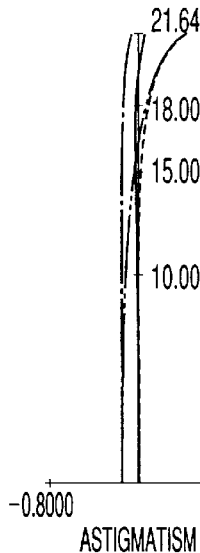
Figure 23C:
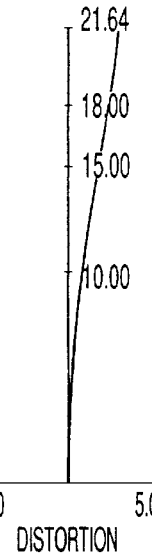
Figure 23D:
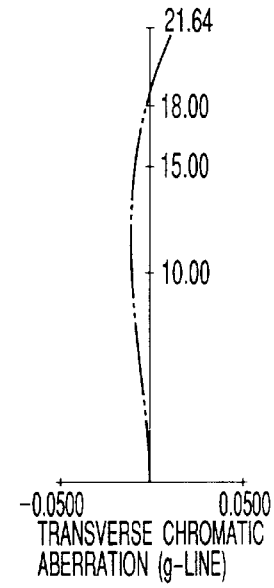
Figure 24A:
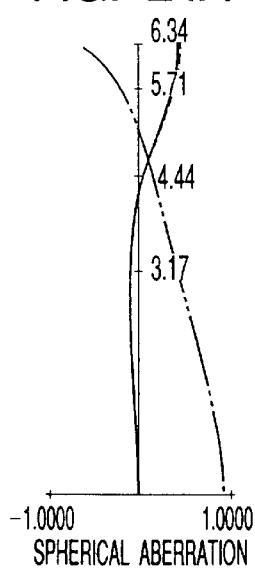
FIGS. 24A, 24B, 24C and 24D are diagrams showing aberrations at the telephoto end of the zoom lens according to Numerical Example 8.
Figure 24B:
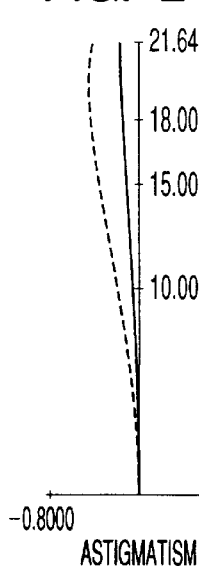
Figure 24C:
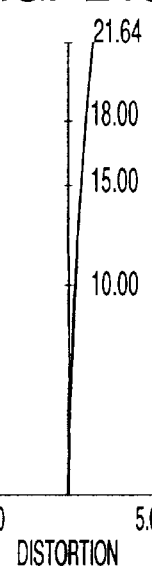
Figure 24D:
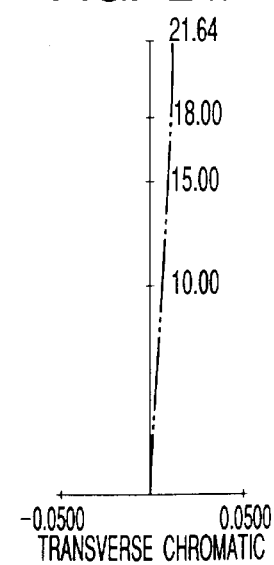

FIG. 22 is a sectional view of a zoom lens relating to Numerical Example 8, showing a state at the wide-angle end. FIGS. 23A to 23D and FIGS. 24A to 24D are diagrams showing aberrations in the zoom position at the wide-angle end and at the telephoto end, respectively, of the zoom lens relating to Numerical Example 8.

Figure 25:
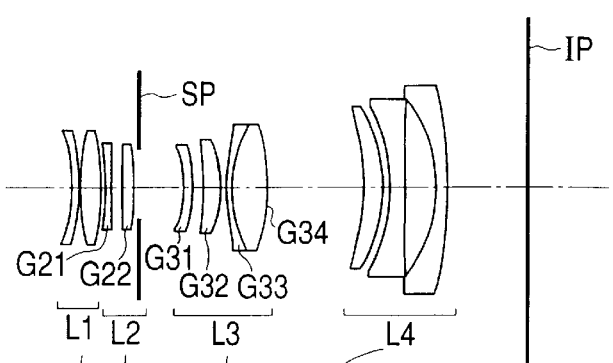
FIG. 25 is a sectional view of a zoom lens according to Numerical Example 9.
Figure 26A:
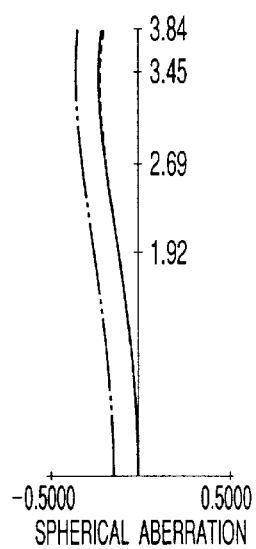
FIGS. 26A, 26B, 26C and 26D are diagrams showing aberrations at the wide-angle end of the zoom lens according to Numerical Example 9.
Figure 26B:
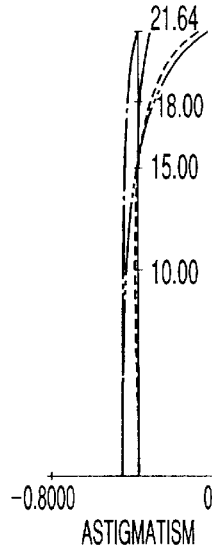
Figure 26C:
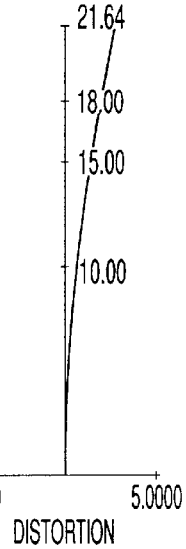
Figure 26D:
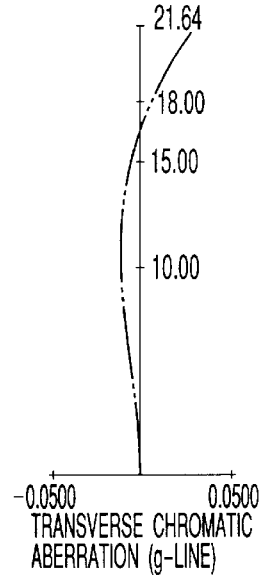
Figure 27A:
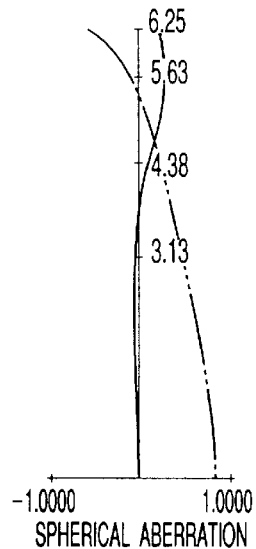
FIGS. 27A, 27B, 27C and 27D are diagrams showing aberrations at the telephoto end of the zoom lens according to Numerical Example 9.
Figure 27B:
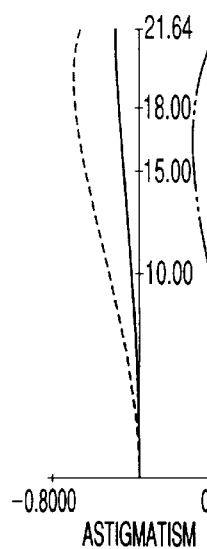
Figure 27C:
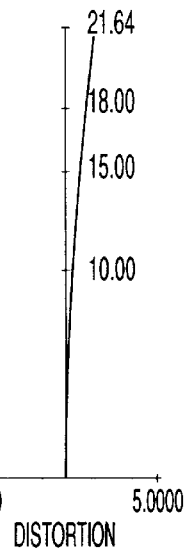
Figure 27D:
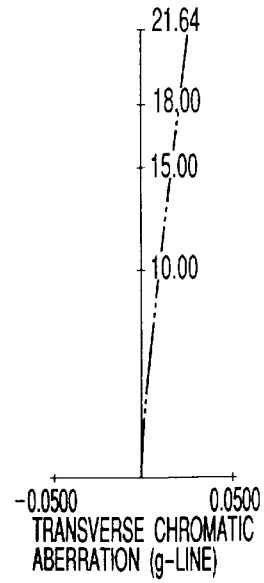

FIG. 25 is a sectional view of a zoom lens relating to Numerical Example 9, showing a state at the wide-angle end. FIGS. 26A to 26D and FIGS. 27A to 27D are diagrams showing aberrations in the zoom position at the wide-angle end and at the telephoto end, respectively, of the zoom lens relating to Numerical Example 9.

Figure 28:
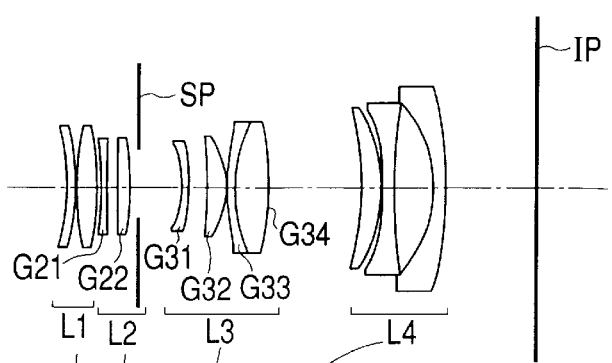
FIG. 28 is a sectional view of a zoom lens according to Numerical Example 10.
Figure 29A:
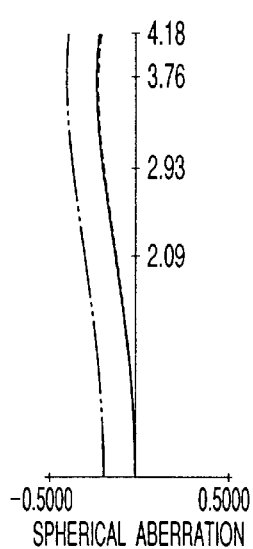
FIGS. 29A, 29B, 29C and 29D are diagrams showing aberrations at the wide-angle end of the zoom lens according to Numerical Example 10.
Figure 29B:
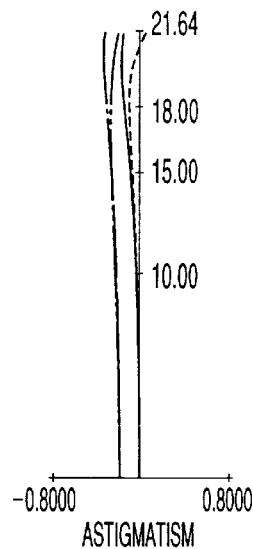
Figure 29C:
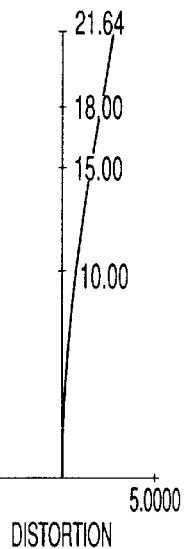
Figure 29D:
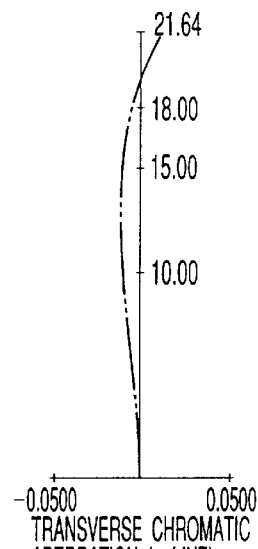
Figure 30A:
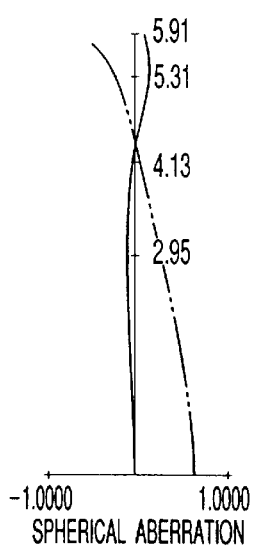
FIGS. 30A, 30B, 30C and 30D are diagrams showing aberrations at the telephoto end of the zoom lens according to Numerical Example 10.
Figure 30B:
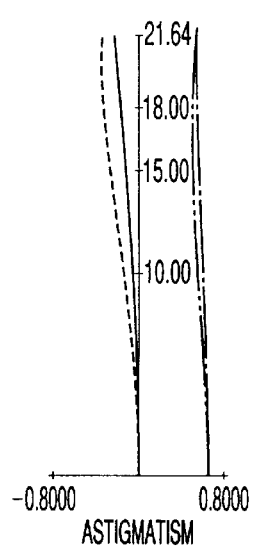
Figure 30C:
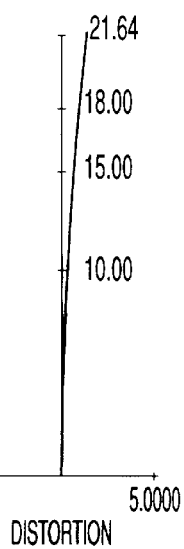
Figure 30D:
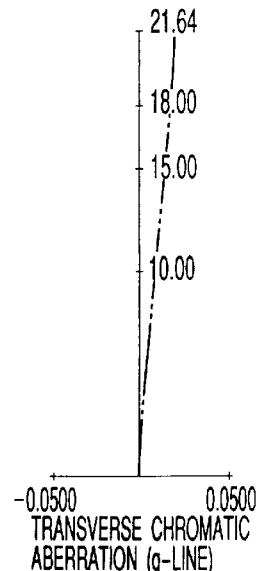

FIG. 28 is a sectional view of a zoom lens relating to Numerical Example 10, showing a state at the wide-angle end. FIGS. 29A to 29D and FIGS. 30A to 30D are diagrams showing aberrations in the zoom position at the wide-angle end and at the telephoto end, respectively, of the zoom lens relating to Numerical Example 10.

FIG. 31 is a sectional view of a zoom lens relating to Numerical Example 11, showing a state at the wide-angle end. FIGS. 32A to 32D and FIGS. 33A to 33D are diagrams showing aberrations in the zoom position at the wide-angle end and at the telephoto end, respectively, of the zoom lens relating to Numerical Example 11.

Each of the lens sectional views of FIGS. 19, 22, 25, 28, and 31 illustrates a first lens unit L1 having a positive refractive power, a second lens unit L2 having a negative refractive power, a third lens unit L3 having a positive refractive power, and a fourth lens unit L4 having a negative refractive power. The magnifying power is changed by moving the lens units toward the end of the zoom lens on the object side, as indicated by the arrows, so that the spacing (axial air spacing) between the first lens unit L1 and the second lens unit L2 at the telephoto end is larger than that at the wide-angle end, and so that the spacing (axial air spacing) between the third lens unit L3 and the fourth lens unit L4 at the telephoto end is smaller than that at the wide-angle end.

An aperture stop is indicated by SP, and an image plane is indicated by IP.

To perform focusing, the whole of or part of the third lens unit L3 is moved.

In this embodiment, if the focal length of the first lens unit L1 is fi; the focal length of the entire system at the wide-angle end is fw; the spacing between the first lens unit L1 and the second lens unit L2 at the wide-angle end is D12w; and the spacing between the second lens unit L2 and the third lens unit L3 at the wide-angle end is D23w, conditions expressed by:

$$1.0 < f1/fw < 2.0 \quad (b1)$$

$$2 < |f2/fw| < 12 \quad (b2)$$

$$0.5 < f3/fw < 0.8 \quad (b3)$$

$$0.3 < |f4/fw| < 0.50 \quad (b4)$$

$$0.05 < D12w/D23w < 0.3 \quad (b5)$$

are satisfied.

In this embodiment, the above-described zoom method and lens construction are adopted to realize a zoom lens in which chromatic aberration is suitably corrected, and which has high optical performance while the overall size of the zoom lens is reduced.

Specifically, in the zoom lens of this embodiment, the fourth lens unit L4 having a negative refractive power has a magnifying power changing function, and the resultant refractive power of the first lens unit L1, the second lens unit L2, and the third lens unit L3 is obtained as a positive power. Thus, the entire lens system is formed as a telephoto type such that the entire optical length at the telephoto end in particular is reduced.

The third lens unit L3 has a negative meniscus lens G31 having a concave surface on the object side, a positive meniscus lens G32 having a concave surface on the object side, a negative lens G33, and a positive lens G34, the lenses G31 to G34 being placed in this order from the object side. If the refractive index and the Abbe number of the negative meniscus lens G31 are Nd31 and ν d31, respectively; the refractive index of the positive lens G34 is Nd34; and the radius of curvature of the lens surface on the object side and the radius of curvature of the lens surface on the image plane side of the lens G34 are Ra and Rb, respectively, conditions expressed by $$1.6 < Nd\,31 < 1.9 \quad (b6)$$

$$40 < \nu d\,31 < 60 \quad (b7)$$

$$1.45 < Nd\,34 < 1.56 \quad (b8)$$

$$-4 < Rb/Ra < -1.3 \quad (b9)$$

are satisfied.

At least one lens surface of the negative meniscus lens G31 is aspherical.

If the coefficient of aspheric of the 4th order term in the equation shown above for representation of the shape of the aspherical surface is B, and if the focal length of the entire system at the wide-angle end is fw, a condition expressed by $$-100 < B \cdot fw^3 < 0.01 \quad (b10)$$

is satisfied.

Also, if the refractive index of the positive lens G34 in the third lens unit L3 is Nd34, a condition expressed by $$1.6 < Nd\,34 < 1.9 \quad (b11)$$

is satisfied.

The second lens unit L2 has a negative lens G21 and a positive lens G22 placed in this order from the object side. If the Abbe numbers of the negative lens G21 and the positive lens G22 are ν 21 and ν 22, respectively, a condition expressed by $$15 < \nu 21n - \nu 22 < 35 \quad (b12)$$

is satisfied.

If the spacing between the second lens unit L2 and the third lens unit L3 at the wide-angle end and the spacing between these lens units at the telephoto end are D23w and D23t, respectively, a condition expressed by $$0.3 < D23w/D23t < 0.9 \quad (b13)$$

is satisfied.

If the focal length of the entire system at the wide-angle end and the focal length of the entire system at the telephoto end are fw and ft, respectively, a condition expressed by $$3.7 < ft/fw < 6.0 \quad (b14)$$

is satisfied.

If the focal length of the entire system at the wide-angle end is fw, and if the back focus (the distance between the lens surface in the outermost position on the image surface side and the paraxial image plane) at the wide-angle end is bfw, a condition expressed by $$0.2 < bfw/fw < 0.4 \quad (b15)$$

is satisfied.

If the back focus (the distance between the lens surface in the outermost position on the image side and the paraxial image plane) at the wide-angle end and the back focus at the telephoto end are bfw and bft, respectively, a condition expressed by $$0.05 < bfw/bft < 0.2 \quad (b16)$$

is satisfied.

The technical meanings of the condition formulas (b1) to (b16) shown above will be described.

The condition formula (b1) specifies the ratio of the focal length of the first lens unit L1 and the focal length of the entire system at the wide-angle end mainly to reduce the size of the entire lens system and to improve the performance of the entire lens system.

If the lower limit value of the condition formula (b1) is exceeded, the refractive power of the first lens unit L1 becomes excessively large and it is difficult to correct spherical aberration at the telephoto end in particular. Therefore, a setting beyond this limit is undesirable. If the upper limit value is exceeded, the refractive power of the first lens unit L1 becomes excessively small and the magnifying power change burden on the final lens unit (fourth lens unit L4) having a negative refractive power is increased, so that it is difficult to obtain a sufficiently high variable magnifying power ratio. The entire length of the lens system is also increased. Therefore, a setting beyond this limit is undesirable.

Preferably, to achieve both a reduction in size and an improvement in performance of the entire lens system, it is desirable to set the lower limit of the condition formula (b1) to 1.2 and to set the upper limit to 1.8.

The condition formula (b2) specifies the ratio of the focal length of the second lens unit L2 and the focal length of the entire system at the wide-angle end mainly to reduce the size of the entire lens system and to improve the performance of the entire lens system.

If the lower limit value of the condition formula (b2) is exceeded, the refractive power of the second lens unit L2 becomes excessively large and it is difficult to correct spherical aberration caused by the second lens unit L2. An increased number of lenses are required to suitably correct this aberration. Moreover, an increase in the lens diameter of the third lens unit L3 results. Therefore, a setting beyond this limit is undesirable. If the upper limit value of the condition formula (b2) is exceeded, the refractive power of the second lens unit L2 becomes excessively small and the effect of the telephoto-type lens formed by the first lens unit L1 and the second lens unit L2 is reduced, so that the entire optical length at the telephoto end in particular is increased. Also, it is difficult to correct distortion at the wide-angle end. Therefore, a setting beyond this limit is undesirable.

Preferably, to achieve both a reduction in size and an improvement in performance of the entire lens system, it is desirable to set the lower limit of the condition formula (b2) to 3.0 and to set the upper limit to 11.0.

The condition formula (b3) specifies the ratio of the focal length of the third lens unit L3 and the focal length of the entire system at the wide-angle end mainly to reduce the size of the entire lens system and to improve the performance of the entire lens system.

If the lower limit value of the condition formula (b3) is exceeded, the refractive power of the third lens unit L3 becomes excessively large and spherical aberration and astigmatism caused by the third lens unit L3 are increased, so that it is difficult to obtain good optical performance in the entire variable magnifying power range. Therefore, a setting beyond this limit is undesirable. If the upper limit value is exceeded, the refractive power of the third lens unit L3 becomes excessively small and it is difficult to ensure a predetermined amount of axial air spacing between the third lens unit L3 and the fourth lens unit L4 at the telephoto end in particular. Further, the amount of movement of the third lens unit L3 at the time of magnifying power change are increased and the Petzval sum tends to increase in the minus direction, resulting in deterioration in image plane characteristics. Therefore, a setting beyond this limit is undesirable.

Preferably, to achieve both a reduction in size and an improvement in performance of the entire lens system, it is desirable to set the lower limit of the condition formula (b3) to 0.6 and to set the upper limit to 0.76.

The condition formula (b4) specifies the ratio of the focal length of the fourth lens unit L4, i.e., the final lens unit having a negative refractive power, and the focal length of the entire system at the wide-angle end mainly to reduce the size of the entire lens system and to improve the performance of the entire lens system.

If the upper limit value of the condition formula (b4) is exceeded, the refractive power of the final lens unit becomes excessively small and the amount of movement of the fourth lens unit L4 at the time of magnifying power change is increased, resulting in an increase in the optical length at the telephoto end. Therefore, a setting beyond this limit is undesirable. If the lower limit value is exceeded, the refractive power of the final lens unit becomes excessively large and it is difficult to correct distortion at the wide-angle end in particular. Also, image plane characteristics become deteriorated. Therefore, a setting beyond this limit is undesirable.

Preferably, to achieve both a reduction in size and an improvement in performance of the entire lens system, it is desirable to set the lower limit of the condition formula (b4) to 0.37 and to set the upper limit to 0.48.

The condition formula (b5) specifies the ratio of the spacing between the first lens unit L1 and the second lens unit L2 and the spacing between the second lens unit L2 and the third lens unit L3 at the wide-angle end to improve the performance in particular.

If the lower limit value of the condition formula (b5) is exceeded, the spacing between the second lens unit L2 and the third lens unit L3 is relatively increased excessively and the first lens unit L1 and the second lens unit L2 are positioned closer to the object-side end of the zoom lens at the wide-angle end, so that the lens diameter of the first lens unit L1 is increased. Therefore a setting beyond this limit is undesirable. If the upper limit value is exceeded, the spacing between the first lens unit L1 and the second lens unit L2 becomes excessively large and it is difficult to correct, distortion caused by the first lens unit L1 having a positive refractive power at the wide-angle end by the second lens unit L2 having a negative refractive power in particular. Therefore, a setting beyond this limit is undesirable.

To further improve the performance, it is desirable to set the lower limit of the condition formula (b5) to 0.07 and to set the upper limit to 0.2.

The condition formula (b6) specifies the refractive index of the material of the negative lens G31 having an aspherical surface in the third lens unit L3 mainly to suitably correct image plane characteristics.

If the lower limit value of the condition formula (b6) is exceeded, the Petzval sum increases in the minus direction and image plane characteristics therefore become deteriorated. A deterioration in astigmatism may also result. Therefore, a setting beyond this limit is undesirable. If the upper limit value is exceeded, it is difficult to select the lens material. Therefore, a setting beyond this limit is undesirable.

The condition formula (b7) specifies the Abbe number of the material of the negative lens G31 having an aspherical surface mainly to suitably correct chromatic aberration.

If the lower limit value of the condition formula (b7) is exceeded, variation in transverse chromatic aberration at the time of magnifying power change is increased in particular. Therefore, a setting beyond this limit is undesirable. If the upper limit value is exceeded, it is difficult to correct longitudinal chromatic aberration. Therefore, a setting beyond this limit is undesirable.

From the viewpoint of correction of chromatic aberration, it is desirable to set the lower limit of the condition formula (b7) to 45.

The condition formula (b8) specifies the refractive power of the material of the positive lens G34 in the image-side outermost position in the third lens unit L3. The positive lens G34 contributes largely to the positive refractive power of the third lens unit L3, forms a retrofocus type in the third lens unit L3, and has the effect of reducing the principal point distance between the third and fourth lens units at the telephoto end by separately increasing the back focus of the third lens unit L3, thereby ensuring the desired variable magnifying power ratio.

If the lower limit value of the condition formula (b8) is exceeded, the image plane curvature at the wide-angle end in particular is increased. This means that the lens thickness is increased because the curvature is increased and it is difficult to ensure the desired axial air spacing between the third lens unit L3 and the fourth lens unit L4 at the telephoto end. Therefore, a setting beyond this limit is undesirable. If the upper limit value is exceeded, the Petzval sum increases in the minus direction and image plane characteristics therefore become deteriorated. Therefore, a setting beyond this limit is undesirable.

It is more preferable to set the upper limit of the condition formula (b8) to 1.54.

The condition formula (b9) specifies the ratio of the radius of curvature of the lens surface on the object side and the radius of curvature of the lens surface on the image side of the positive lens G34 in the image-side outermost position in the third lens unit L3.

If the lower limit value of the condition formula (b9) is exceeded, the radius of curvature of the lens surface on the object side is relatively increased excessively and the rear side principal point is positioned closer to the object-side end. The back focus of the third lens unit L3 is thus reduced. It is difficult to ensure the desired axial air spacing between the third lens unit L3 and the fourth lens unit L4 at the telephoto end. Therefore, a setting beyond this limit is undesirable. If the upper limit value is exceeded, under correction of spherical aberration at the telephoto end in particular results. Therefore, a setting beyond this limit is undesirable.

It is more preferable to set the lower limit of the condition formula (b9) to −3.0 and to set the upper limit to −1.5.

The condition formula (b10) specifies the shape of the aspherical surface of the negative lens G31 in the third lens unit L3 mainly to suitably correct spherical aberration at the telephoto end.

The third lens unit L3 has a comparatively large positive refractive power. In the third lens unit L3, therefore, "under" spherical aberration tends to increase at the telephoto end in particular. This tendency is considerable in a case where the refractive power of the third lens unit L3 is increased for the purpose of reducing the overall size of the entire lens system or the third lens unit L3 is designed to obtain a high variable magnifying power ratio. Therefore, an aspherical surface is formed on the negative lens G31 in the third lens unit L3 such that the positive refractive power decreases from a lens center toward the periphery, thereby correcting spherical aberration caused by the third lens unit L3.

If the lower limit value of the condition formula (b10) is exceeded, the degree of asphericity becomes excessively high and overcorrection of spherical aberration at the telephoto end in particular results. Therefore, a setting beyond this limit is undesirable. If the upper limit is exceeded, undercorrection of spherical aberration at the telephoto end in particular results. Therefore, a setting beyond this limit is undesirable.

The condition formula (b11) has the same technical meaning as that of the condition formula (b8) described above.

The condition formula (b12) relates to the Abbe numbers of the materials of lenses in the second lens unit in the case where the second lens unit has the negative lens G21 and the positive lens G22 placed in this order from the object side. To correct distortion at the wide-angle end, it is desirable to place the negative lens G21 on the object side. Also, if the positive lens G22 is placed on the image side of the negative lens G21 to satisfy the condition expressed by the condition formula (b12), variation in transverse chromatic aberration which occurs mainly at the time of magnifying power change can be corrected effectively.

If the lower limit value of the condition formula (b12) is exceeded, it is difficult to obtain the effect of correcting variation in transverse chromatic aberration at the time of magnifying power change. Therefore, a setting beyond this limit is undesirable. If the upper limit value is exceeded, overcorrection of longitudinal chromatic aberration at the telephoto end in particular results and it is difficult to obtain high optical performance. Therefore, a setting beyond this limit is undesirable.

It is more preferable to modify the numerical value range of the condition formula (b12) as shown by $$20 < v21 - v22 < 30$$

The condition formula (b13) specifies the ratio of the axial air spacing between the second lens unit L2 and the third lens unit L3 at the wide-angle end and the axial air spacing between these lens units at the telephoto end.

If the lower limit value of the condition formula (b13) is exceeded, the second lens unit L2 is relatively positioned on the object side at the telephoto end and the effective lens diameter of the second lens unit L2 is increased. The amount of movement of the second lens unit L2 at the time of magnifying power change is also increased. Therefore, a setting beyond this limit is undesirable. If the upper limit value is exceeded, the second lens unit L2 is relatively positioned on the image side at the telephoto end and a sufficiently high chromatic aberration correction effect cannot be obtained. Therefore, a setting beyond this limit is undesirable.

It is more preferable to modify the numerical value range of the condition formula (b13) as shown by $$0.5 < D23w/D23t < 0.85$$

The condition formula (b14) specifies the ratio of the focal length of the entire system at the wide-angle end and the focal length of the entire system at the telephoto end mainly to set a suitable variable magnifying power ratio.

If the lower limit value of the condition formula (b14) is exceeded, it is difficult to achieve a high variable magnifying power, which corresponds to one of the objects of the present invention. Therefore, a setting beyond this limit is undesirable. If the upper limit value is exceeded, the variable magnifying power ratio is excessively high and it is difficult to obtain high optical performance. Therefore, a setting beyond this limit is undesirable.

It is more preferable to set the upper limit of the condition formula (b14) to 5.0.

Further, it is more preferable to set the lower limit to 3.85.

The condition formula (b15) relates to the ratio of the back focus at the wide-angle end and the focal length of the entire system at the wide-angle end and is provided to reduce the size of the entire lens system and to balance the optical performance.

If the lower limit value of the condition formula (b15) is exceeded, the back focus at the wide-angle end becomes excessively small and the lens diameter of the fourth lens unit L4 is increased. The exit angle is also increased excessively, so that it is difficult to maintain the desired rim light quantity. Therefore, a setting beyond this limit is undesirable.

If the upper limit value is exceeded, the back focus at the wide-angle end becomes excessively large and the magnifying power of the fourth lens unit may be increased so such an extent that the focus sensitivity of the fourth lens unit L4 at the telephoto end is disadvantageously high. Therefore a setting beyond this limit is undesirable.

It is more preferable to modify the numerical value range of the condition formula (b15) as shown by $$0.21 < bfw/fw < 0.3$$

The condition formula (b16) relates to the ratio of the back focus at the wide-angle end and the back focus at the telephoto end and is provided mainly to reduce the size of the entire lens system.

If the lower limit value of the condition formula (b16) is exceeded, the amount of movement of the fourth lens unit L4 becomes excessively large. Therefore, a setting beyond this limit is undesirable. If the upper limit value is exceeded, the fourth lens unit L4 cannot have a sufficiently high variable magnifying power ratio. Therefore, a setting beyond this limit is undesirable.

It is more preferable to modify the numerical value range of the condition formula (b16) as shown by $$0.01 < bfw/bft < 0.15$$

In the zoom lens of this embodiment, the aperture stop SP is moved integrally with the second lens unit L2 during zooming. Alternatively, the aperture stop SP and the second lens unit L2 may be moved separately from each other.

While it is preferable to perform focusing by moving the whole or part of the third lens unit L3, focusing may be performed by some other lens unit (first lens unit L1, fourth lens unit L4).

One of the lens units or an element in one lens unit may be shifted in a direction approximately perpendicular to the optical axis to make a camera shake correction.

To simplify the mechanical structure, the lens system may be arranged so that the first lens unit L1 and the fourth lens unit L4 are moved integrally with each other during zooming.

Numerical data in the Numerical Examples 7 to 11 is shown below.

Table 2 shows the correspondence between the numerical examples and the condition formulas shown above.

Numerical Example 7
f = 38.1 – 150.7   Fno = 4.95 – 12.05   2ω = 59.2 – 16.3

| R 1 = | −20.747 | D 1 = | 0.90 | N 1 = | 1.846660 | ν 1 = | 23.9 |
|---|---|---|---|---|---|---|---|
| R 2 = | −28.592 | D 2 = | 0.12 | | | | |
| R 3 = | 34.207 | D 3 = | 2.40 | N 2 = | 1.487490 | ν 2 = | 70.2 |
| R 4 = | −34.207 | D 4 = | Variable | | | | |
| R 5 = | −30.633 | D 5 = | 0.70 | N 3 = | 1.804000 | ν 3 = | 46.6 |
| R 6 = | 175.206 | D 6 = | 1.22 | | | | |
| R 7 = | 571.450 | D 7 = | 1.40 | N 4 = | 1.846660 | ν 4 = | 23.9 |
| R 8 = | −37.312 | D 8 = | 0.70 | | | | |
| R 9 = | Aperture Stop | D 9 = | Variable | | | | |
| *R10 = | −11.752 | D10 = | 0.90 | N 5 = | 1.665320 | ν 5 = | 55.4 |
| R11 = | −25.476 | D11 = | 1.31 | | | | |
| R12 = | −34.469 | D12 = | 1.95 | N 6 = | 1.487490 | ν 6 = | 70.2 |
| R13 = | −11.041 | D13 = | 0.62 | | | | |
| R14 = | 24.008 | D14 = | 0.80 | N 7 = | 1.846660 | ν 7 = | 23.9 |
| R15 = | 14.370 | D15 = | 4.00 | N 8 = | 1.516330 | ν 8 = | 64.2 |
| R16 = | −30.964 | D16 = | Variable | | | | |
| R17 = | −39.262 | D17 = | 2.65 | N 9 = | 1.846660 | ν 9 = | 23.9 |
| R18 = | −16.618 | D18 = | 0.13 | | | | |
| R19 = | −19.485 | D19 = | 1.15 | N10 = | 1.772499 | ν10 = | 49.6 |
| R20 = | 94.444 | D20 = | 4.47 | | | | |
| R21 = | −14.178 | D21 = | 1.30 | N11 = | 1.772499 | ν11 = | 49.6 |
| R22 = | −50.927 | | | | | | |

| | Focal Length | | |
|---|---|---|---|
| Variable Interval | 38.1 | 57.8 | 150.7 |
| D 4 | 0.56 | 3.24 | 13.24 |
| D 9 | 5.45 | 5.15 | 5.90 |
| D16 | 10.24 | 6.73 | 0.81 |

Coefficient of Aspheric
The 10th surface:

K = 0.00000e+00
B = −4.59133e−05
C = −7.03950e−07
D = −1.78135e−09
E = 0.00000e+00
F = 0.00000e+00

Numerical Example 8
f = 39.1 – 155.5   Fno = 4.95 – 12.26   2ω = 58.0 – 15.8

| R 1 = | −20.774 | D 1 = | 0.90 | N 1 = | 1.846660 | ν 1 = | 23.9 |
|---|---|---|---|---|---|---|---|
| R 2 = | −28.505 | D 2 = | 0.12 | | | | |
| R 3 = | 34.405 | D 3 = | 2.40 | N 2 = | 1.487490 | ν 2 = | 70.2 |
| R 4 = | −34.405 | D 4 = | Variable | | | | |
| R 5 = | −30.555 | D 5 = | 0.70 | N 3 = | 1.804000 | ν 3 = | 46.6 |
| R 6 = | 172.837 | D 6 = | 1.23 | | | | |
| R 7 = | 557.790 | D 7 = | 1.40 | N 4 = | 1.846660 | ν 4 = | 23.9 |
| R 8 = | −37.266 | D 8 = | 0.80 | | | | |
| R 9 = | Aperture Stop | D 9 = | Variable | | | | |
| *R10 = | −11.736 | D10 = | 0.90 | N 5 = | 1.665320 | ν 5 = | 55.4 |
| R11 = | −25.382 | D11 = | 1.27 | | | | |

-continued

| | | | | | | | |
|---|---|---|---|---|---|---|---|
| R12 = | −33.998 | D12 = | 1.95 | N 6 = | 1.487490 | ν 6 = | 70.2 |
| R13 = | −11.031 | D13 = | 0.85 | | | | |
| R14 = | 23.961 | D14 = | 0.80 | N 7 = | 1.846660 | ν 7 = | 23.9 |
| R15 = | 14.296 | D15 = | 4.00 | N 8 = | 1.516330 | ν 8 = | 64.2 |
| R16 = | −30.694 | D16 = | Variable | | | | |
| R17 = | −39.034 | D17 = | 2.65 | N 9 = | 1.846660 | ν 9 = | 23.9 |
| R18 = | −16.523 | D18 = | 0.13 | | | | |
| R19 = | −19.357 | D19 = | 1.15 | N10 = | 1.772499 | ν10 = | 49.6 |
| R20 = | 94.180 | D20 = | 4.35 | | | | |
| R21 = | −14.104 | D21 = | 1.25 | N11 = | 1.772499 | ν11 = | 49.6 |
| R22 = | −50.405 | | | | | | |

| | Focal Length | | |
|---|---|---|---|
| Variable Interval | 39.1 | 59.2 | 155.5 |
| D 4 | 0.53 | 3.39 | 13.60 |
| D 9 | 5.36 | 5.03 | 5.51 |
| D16 | 10.19 | 6.75 | 0.83 |

Coefficient of Aspheric
The 10th surface:

K = 0.00000e+00
B = −4.47988e−05
C = −7.10101e−07
D = −1.14534e−09
E = 0.00000e+00
F = 0.00000e+00

Numerical Example 9
f = 38.0 − 150.7   Fno = 4.95 − 12.05   2ω = 59.3 − 16.4

| | | | | | | | |
|---|---|---|---|---|---|---|---|
| R 1 = | −22.775 | D 1 = | 0.90 | N 1 = | 1.846660 | ν 1 = | 23.9 |
| R 2 = | −30.846 | D 2 = | 0.12 | | | | |
| R 3 = | 38.085 | D 3 = | 2.20 | N 2 = | 1.487490 | ν 2 = | 70.2 |
| R 4 = | −38.085 | D 4 = | Variable | | | | |
| R 5 = | −29.394 | D 5 = | 0.70 | N 3 = | 1.772499 | ν 3 = | 49.6 |
| R 6 = | 318.288 | D 6 = | 1.28 | | | | |
| R 7 = | 1,348.363 | D 7 = | 1.40 | N 4 = | 1.846660 | ν 4 = | 23.9 |
| R 8 = | −40.778 | D 8 = | 0.70 | | | | |
| R 9 = | Aperture Stop | D 9 = | Variable | | | | |
| *R10 = | −12.406 | D10 = | 0.90 | N 5 = | 1.665320 | ν 5 = | 55.4 |
| R11 = | −30.045 | D11 = | 1.28 | | | | |
| R12 = | −37.355 | D12 = | 2.00 | N 6 = | 1.487490 | ν 6 = | 70.2 |
| R13 = | −11.679 | D13 = | 0.52 | | | | |
| R14 = | 23.084 | D14 = | 0.80 | N 7 = | 1.846660 | ν 7 = | 23.9 |
| R15 = | 14.711 | D15 = | 4.15 | N 8 = | 1.487490 | ν 8 = | 70.2 |
| R16 = | −24.425 | D16 = | Variable | | | | |
| R17 = | −34.323 | D17 = | 2.70 | N 9 = | 1.846660 | ν 9 = | 23.9 |
| R18 = | −16.909 | D18 = | 0.98 | | | | |
| R19 = | −17.115 | D19 = | 1.20 | N10 = | 1.772499 | ν10 = | 49.6 |
| R20 = | 170.924 | D20 = | 3.74 | | | | |
| R21 = | −16.784 | D21 = | 1.30 | N11 = | 1.772499 | ν11 = | 49.6 |
| R22 = | −59.506 | | | | | | |

| | Focal Length | | |
|---|---|---|---|
| Variable Interval | 38.0 | 56.94 | 150.7 |
| D 4 | 0.55 | 3.72 | 16.60 |
| D 9 | 5.25 | 5.02 | 5.76 |
| D16 | 10.73 | 7.19 | 0.81 |

Coefficient of Aspheric
The 10th surface:

K = 0.00000e+00
B = −4.39802e−05
C = −6.34838e−07
D = 0.00000e+00
E = 0.00000e+00
F = 0.00000e+00

Numerical Example 10
f = 38.7 – 151.2  Fno = 4.63 – 12.80  2ω = 58.4 – 16.3

| | | | | | | | |
|---|---|---|---|---|---|---|---|
| R 1 = | −23.591 | D 1 = | 0.90 | N 1 = | 1.846660 | ν 1 = | 23.9 |
| R 2 = | −34.005 | D 2 = | 0.12 | | | | |
| R 3 = | 35.795 | D 3 = | 2.25 | N 2 = | 1.487490 | ν 2 = | 70.2 |
| R 4 = | −35.795 | D 4 = | Variable | | | | |
| R 5 = | −27.682 | D 5 = | 1.09 | N 3 = | 1.772499 | ν 3 = | 49.6 |
| R 6 = | 191.360 | D 6 = | 0.98 | | | | |
| R 7 = | 4,979.008 | D 7 = | 1.50 | N 4 = | 1.805181 | ν 4 = | 25.4 |
| R 8 = | −29.388 | D 8 = | 0.98 | | | | |
| R 9 = | Aperture Stop | D 9 = | Variable | | | | |
| *R10 = | −12.501 | D10 = | 0.90 | N 5 = | 1.730770 | ν 5 = | 40.6 |
| R11 = | −25.736 | D11 = | 1.98 | | | | |
| R12 = | −31.320 | D12 = | 2.23 | N 6 = | 1.487490 | ν 6 = | 70.2 |
| R13 = | −11.033 | D13 = | 0.10 | | | | |
| R14 = | 27.124 | D14 = | 0.90 | N 7 = | 1.846660 | ν 7 = | 23.9 |
| R15 = | 16.900 | D15 = | 3.96 | N 8 = | 1.516330 | ν 8 = | 64.2 |
| R16 = | −34.920 | D16 = | Variable | | | | |
| R17 = | −44.517 | D17 = | 2.45 | N 9 = | 1.846660 | ν 9 = | 23.9 |
| R18 = | −18.800 | D18 = | 0.10 | | | | |
| R19 = | −24.521 | D19 = | 1.20 | N10 = | 1.772499 | ν10 = | 49.6 |
| R20 = | 90.405 | D20 = | 4.63 | | | | |
| R21 = | −14.154 | D21 = | 1.35 | N11 = | 1.772499 | ν11 = | 49.6 |
| R22 = | −52.584 | | | | | | |

| | Focal Length | | |
|---|---|---|---|
| Variable Interval | 38.7 | 57.01 | 151.2 |
| D 4 | 0.63 | 4.29 | 11.93 |
| D 9 | 4.91 | 4.22 | 5.94 |
| D16 | 10.43 | 6.83 | 0.82 |

Coefficient of Aspheric
The 10th surface:

K = 0.00000e+00
B = −5.24418e−05
C = −6.15654e−07
D = −3.20819e−09
E = 0.00000e+00
F = 0.00000e+00

Numerical Example 11
f = 36.0 – 160.0  Fno = 5.00 – 13.00  2ω = 62.1 – 15.4

| | | | | | | | |
|---|---|---|---|---|---|---|---|
| R 1 = | −22.731 | D 1 = | 0.90 | N 1 = | 1.846660 | ν 1 = | 23.9 |
| R 2 = | −30.542 | D 2 = | 0.12 | | | | |
| R 3 = | 38.683 | D 3 = | 2.20 | N 2 = | 1.487490 | ν 2 = | 70.2 |
| R 4 = | −38.683 | D 4 = | Variable | | | | |
| R 5 = | −28.718 | D 5 = | 0.70 | N 3 = | 1.804000 | ν 3 = | 46.6 |
| R 6 = | 173.812 | D 6 = | 1.23 | | | | |
| R 7 = | 1,049.508 | D 7 = | 1.40 | N 4 = | 1.846660 | ν 4 = | 23.9 |
| R 8 = | −36.308 | D 8 = | 0.70 | | | | |
| R 9 = | Aperture Stop | D 9 = | Variable | | | | |
| R10 = | −12.156 | D10 = | 0.80 | N 5 = | 1.743198 | ν 5 = | 49.3 |
| R11 = | −23.572 | D11 = | 1.78 | | | | |
| R12 = | −42.639 | D12 = | 2.05 | N 6 = | 1.487490 | ν 6 = | 70.2 |
| R13 = | −11.663 | D13 = | 0.18 | | | | |
| R14 = | 23.517 | D14 = | 0.80 | N 7 = | 1.846660 | ν 7 = | 23.9 |
| R15 = | 14.853 | D15 = | 4.20 | N 8 = | 1.487490 | ν 8 = | 70.2 |
| *R16 = | −27.051 | D16 = | Variable | | | | |
| R17 = | −34.897 | D17 = | 2.60 | N 9 = | 1.846660 | ν 9 = | 23.9 |
| R18 = | −16.651 | D18 = | 0.91 | | | | |
| R19 = | −16.939 | D19 = | 1.10 | N10 = | 1.772499 | ν10 = | 49.6 |
| R20 = | 192.888 | D20 = | 3.74 | | | | |
| R21 = | −16.855 | D21 = | 1.20 | N11 = | 1.772499 | ν11 = | 49.6 |
| R22 = | −76.582 | | | | | | |

| | Focal Length | | |
|---|---|---|---|
| Variable Interval | 36.0 | 56.5 | 160.0 |
| D 4 | 0.64 | 4.09 | 18.31 |
| D 9 | 5.30 | 5.01 | 5.58 |

-continued

| | | | |
|---|---|---|---|
| D16 | 10.93 | 7.08 | 0.60 |

Coefficient of Aspheric
The 10th surface:

K = 0.00000e+00
B = −4.09132e−05
C = −7.66674e−07
D = 1.11392e−09
E = 0.00000e+00
F = 0.00000e+00

TABLE 2

| | Numerical Example | | | | |
|---|---|---|---|---|---|
| Condition Formula | 7 | 8 | 9 | 10 | 11 |
| (b1) f1/fw | 1.43 | 1.39 | 1.57 | 1.51 | 1.67 |
| (b2) \|f2\|/fw | 5.20 | 5.02 | 4.46 | 10.80 | 4.11 |
| (b3) f3/fw | 0.71 | 0.70 | 0.70 | 0.74 | 0.71 |
| (b4) \|f4\|/fw | 0.43 | 0.42 | 0.45 | 0.46 | 0.46 |
| (b5) D12w/D23w | 0.09 | 0.09 | 0.09 | 0.11 | 0.11 |
| (b6) Nd31 | 1.67 | 1.67 | 1.67 | 1.73 | 1.74 |
| (b7) ν d31 | 55.40 | 55.40 | 55.40 | 49.60 | 49.31 |
| (b8, 11) Nd34 | 1.52 | 1.52 | 1.49 | 1.52 | 1.49 |
| (b9) Rb/Ra | −2.15 | −2.15 | −1.66 | −2.07 | −1.85 |
| (b10) B · fw³ | −2.54 | −2.68 | −2.41 | −3.04 | −1.91 |
| (b12) ν d21 − ν d22 | 22.70 | 22.67 | 25.70 | 24.20 | 22.65 |
| (b13) D23w/D23t | 0.73 | 0.69 | 0.69 | 0.64 | 0.77 |
| (b14) ft/tw | 3.95 | 3.98 | 3.96 | 3.91 | 4.44 |
| (b15) bfw/fw | 0.22 | 0.23 | 0.23 | 0.24 | 0.22 |
| (b16) bfw/bft | 0.12 | 0.13 | 0.13 | 0.12 | 0.11 |

Embodiment 3

An embodiment of a lens shutter camera (optical device) using as a photographing optical system any of the zoom lenses in accordance with the above-described embodiments will be described with reference to FIG. 34.

Figure 34:
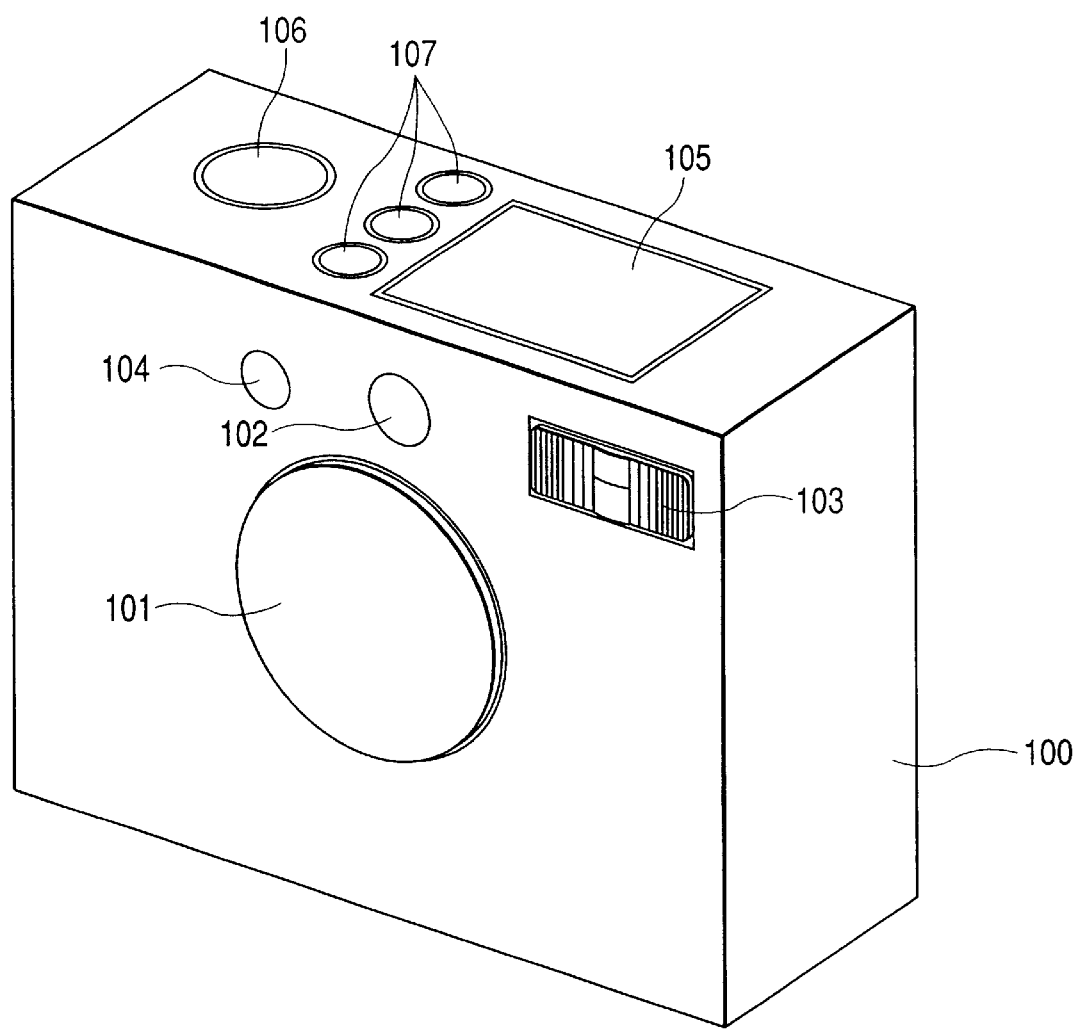
FIG. 34 is a schematic diagram of an essential portions of a camera in accordance with the present invention.

FIG. 34 illustrates a camera body 100, a photographing optical system 101 constituted of the zoom lenses in accordance with any one of Numerical Examples 1 to 11, and a finder optical system 102 through which a subject image is observed.

The photographing optical system 101 forms an image of a subject on a photosensitive surface such as a film surface or a light receiving surface of a solid-state image pickup device.

The camera also has a strobe device 103, a photometry window 104, a liquid crystal display window for information about camera operations, a shutter release button 106, and operating switches 107 for changing various modes.

If the zoom lens of the present invention is applied to the photographing optical system of a lens shutter camera such as that in this embodiment, a compact high-performance camera can be realized.

What is claimed is:

1. A zoom lens comprising:
a first lens unit having a positive optical power;
a second lens unit including a negative biconcave lens and a positive lens in this order from an object side to an image side;
a third lens unit moved for focusing; and
a fourth lens unit having a negative optical power, said first to fourth lens units being placed in this order from the object side to the image side, wherein zooming is performed by moving said lens units so that a spacing between said first lens unit and said second lens unit at a telephoto end is larger than the spacing between said first lens unit and said second lens unit at a wide-angle end, and so that the spacing between said third lens unit and said fourth lens unit at the telephoto end is smaller than the spacing between said third lens unit and said fourth lens unit at the wide-angle end, and wherein focal lengths of said first lens unit and said fourth lens units are f1 and f4, respectively, and the focal length of entire system at the wide-angle end and the focal length of the entire system at the telephoto end are fw and ft, respectively, conditions expressed by $$0.2 < f1/ft < 0.5$$

$$-0.2 < f4/ft < -0.05$$

and $$3.7 < ft/fw < 6.0$$

are satisfied.

2. A zoom lens according to claim 1, wherein if a radius of curvature of the lens surface on the object side of the negative lens in the closest position to the object side in said second lens unit and the radius of curvature of the lens surface on the image side of the negative lens are R21n1 and R21n2, respectively, and the radius of curvature of the lens surface on the object side of the positive lens in the closest position to the object side in said second lens unit and the radius of curvature of the lens surface on the image side of the positive lens are R21p1 and R21p2, respectively, conditions expressed by $$-1 < (R21n1 + R21n2)/(R21n1 - R21n2) < 1$$

and $$0.5 < (R21p1 - R21p2)/(R21p1 + R21p2) < 8$$

are satisfied.

3. A zoom lens according to claim 1, wherein Abbe numbers of the negative lens and the positive lens in said second lens unit are ν 21n and ν 21p, respectively, a condition expressed by $$20 < \nu21n - \nu21p < 40$$

is satisfied.

4. A zoom lens according to claim 1, further comprising an aperture stop placed between said second lens unit and said third lens unit, wherein the spacing between said aperture stop and said third lens unit at the telephoto end is Lp, a condition expressed by $$0.02 < Lpa/ft < 0.1$$

is satisfied.

5. A zoom lens according to claim 1, wherein the focal length of said second lens unit is f2, a condition expressed by $$0<|ft/f2|<0.5$$

is satisfied.

6. A zoom lens according to claim 1, wherein said second lens unit has a negative optical power, and said third lens unit has a positive optical power.

7. A zoom lens according to claim 1, wherein said first lens unit consists of a negative meniscus lens with a concave surface on the object side, and a positive biconvex lens which are placed in this order from the object side to the image side.

8. A zoom lens according to claim 1, wherein said fourth lens unit consists of a positive lens, a negative lens, and a negative lens which are placed in this order from the object side to the image side.

9. A zoom lens comprising:

a first lens unit having a positive optical power;

a second lens unit;

a third lens unit having a negative meniscus lens with a concave surface on an object side and a positive meniscus lens with a convex surface on an image side, said negative and positive meniscus lenses being placed in this order from the object side to the image side, said third lens unit being moved for focusing; and a fourth lens unit having a negative optical power, said first to fourth lens units being placed in this order from the object side to the image side, wherein zooming is performed by moving said lens units so that a spacing between said first lens unit and said second lens unit at the telephoto end is larger than the spacing between said first lens unit and said second lens unit at the wide-angle end, and so that the spacing between said third lens unit and said fourth lens unit at the telephoto end is smaller than the spacing between said third lens unit and said fourth lens unit at the wide-angle end, and wherein focal lengths of said first lens unit and said fourth lens units are f1 and f4, respectively, and the focal length of entire system at the wide-angle end and the focal length of the entire system at the telephoto end are fw and ft, respectively, conditions expressed by $$0.2<f1/ft<0.5$$

$$-0.2<f4/ft<-0.05$$

and $$3.7<ft/fw<6.0$$

are satisfied.

10. A zoom lens according to claim 9, wherein if the radius of curvature of the lens surface on the object side of the negative meniscus lens in the closest position to the object side in said third lens unit and the radius of curvature of the lens surface on the image side of the negative meniscus lens are R31n1 and R31n2, respectively, a condition expressed by $$-1<(R31n1-R31n2)/(R31n1+R31n2)<0$$

is satisfied.

11. A zoom lens according to claim 9, further comprising an aperture stop placed between said second lens unit and said third lens unit, wherein the spacing between said aperture stop and said third lens unit at the telephoto end is Lp, a condition expressed by $$0.02<Lpa/ft<0.1$$

is satisfied.

12. A zoom lens according to claim 9, wherein the focal length of said second lens unit is f2, a condition expressed by $$0<|ft/f2|<0.5$$

is satisfied.

13. A zoom lens according to claim 9, wherein said second lens unit has a negative optical power, and said third lens unit has a positive optical power.

14. A zoom lens according to claim 9, wherein said first lens unit consists of a negative meniscus lens with a concave surface on the object side, and a positive biconvex lens which are placed in this order from the object side to the image side.

15. A zoom lens according to claim 9, wherein said fourth lens unit consists of a positive lens, a negative lens, and a negative lens which are placed in this order from the object side to the image side.

16. A zoom lens comprising:

a first lens unit having a positive optical power;

a second lens unit having an aperture stop which is moved integrally with said second lens unit during zooming;

a third lens unit having a positive optical power, said third lens unit having a negative lens and a positive lens in this order from the object side to the image side; and a fourth lens unit having a negative optical power, said first to fourth lens units being placed in this order from the object side to the image side, wherein zooming is performed by moving said lens units so that the spacing between said first lens unit and said second lens unit at the telephoto end is larger than the spacing between said first lens unit and said second lens unit at the wide-angle end, and so that the spacing between said third lens unit and said fourth lens unit at the telephoto end is smaller than the spacing between said third lens unit and said fourth lens unit at the wide-angle end, and wherein the focal lengths of said first lens unit and said fourth lens units are f1 and f4, respectively, the focal length of the entire system at the wide-angle end and the focal length of the entire system at the telephoto end are fw and ft, respectively, an Abbe number of the negative lens in the closest position to the object side in said third lens unit is v3n, and the Abbe number of the positive lens closest to the object side in said third lens unit is v3p, conditions expressed by $$0.2<f1/ft<0.5$$

$$-0.2<f4/ft<-0.05$$

$$3.7<ft/fw<6.0$$

and $$20<v3p-v3n<50$$

are satisfied.

17. A zoom lens according to claim 16, wherein the focal length of said second lens unit is f2, a condition expressed by $$0<|ft/f2|<0.5$$

is satisfied.

18. A zoom lens according to claim 16, wherein said second lens unit has a negative optical power.

19. A zoom lens according to claim 16, wherein said third lens unit has an aspherical lens whose optical power decreases from a lens center toward a lens peripheral portion.

20. A zoom lens according to claim 16, wherein said stop is positioned between said second lens unit and said third lens unit, and wherein the spacing between said stop and said third lens unit at the telephoto end is Lp, a condition expressed by $$0.02 < Lp/ft < 0.1$$

is satisfied.

21. A zoom lens according to claim 16, wherein said first lens unit consists of a negative meniscus lens with a concave surface on the object side, and a positive biconvex lens which are placed in this order from the object side to the image side.

22. A zoom lens according to claim 16, wherein said fourth lens unit consists of a positive lens, a negative lens, and a negative lens which are placed in this order from the object side to the image side.

23. A zoom lens comprising;
  a first lens unit having a positive optical power;
  a second lens unit having a negative optical power;
  a third lens unit having a positive optical power;
  a fourth lens unit having a negative optical power, said first to fourth lens being placed in this order from the object side to the image side, wherein zooming is performed by moving said lens units so that the spacing between said first lens unit and said second lens unit at the telephoto end is larger than the spacing between said first lens unit and said second lens unit at the wide-angle end, and so that the spacing between said third lens unit and said fourth lens unit at the telephoto end is smaller than the spacing between said third lens unit and said fourth lens unit at the telephoto end is smaller than the spacing between said third lens unit and said fourth lens unit at the wide-angle end, and
  wherein the focal length of said first, second, third, and fourth lens units is f1, f2, f3, and f4, respectively, the focal length of the entire system at the wide-angle end is fw, the distance between said first lens unit and said second lens unit at the wide-angle end is D12w, and the distance between said second lens unit and said third lens unit at the wide-angle end is D23W, at least one of conditions expressed by $$1.0 < f1/fw < 2.0$$

$$2 < |f2/fw| < 12$$

$$0.5 < f3/fw < 0.8$$

$$0.3 < |f4/fw| < 0.50$$

and $$0.05 < D12w/D23w < 0.3$$

is satisfied.

24. A zoom lens according to claim 23, wherein said third lens unit has a negative lens in the closest position to the object side and at least one of two surfaces of the negative lens is an aspherical surface, and wherein if the aspherical surface of a radius of paraxial curvature is R, a direction of the optical axis is represented by X-axis, a direction perpendicular to the optical axis is represented by Y-axis, a conic constant is K, and coefficient of aspherics are respectively represented by B, C, C, E, and F, and the aspherical surface is expressed by $$X=(1/R)Y^2/[1+\text{square toot}\{1-(1+K)(Y/R)^2\}]+BY^4+CY^6+DY^8+EY^{10}+FY^{12}$$

and the focal length of the entire system at the wide-angle end is represented by fw, a condition expressed by $$-100 < B \cdot fw^3 < 0.01$$

is satisfied.

25. A zoom lens according to claim 23, wherein said third lens unit has a positive lens in the closest position to the image side, and wherein the refractive index of the positive lens in the closest position to the image side in said third lens unit is Nd34, a condition expressed by $$1.6 < Nd\ 34 < 1.9$$

is satisfied.

26. A zoom lens according to claim 23, wherein said third lens unit has a negative meniscus lens with an aspherical surface formed as a concave surface on the object side, a positive meniscus lens with a concave surface on the object side, a negative lens, and a positive lens, the negative meniscus lens, the positive meniscus lens, the negative lens and the positive lens being placed in this order from the object side to the image side, and wherein if the refractive index and the Abbe number of the negative meniscus lens in said third lens unit are Nd31 and ν d31, respectively, the refractive index of the positive lens in said third lens unit is Nd34, and the radius of curvature of the lens surface on the object side and the radius of curvature of the lens surface on the image side of the positive lens in said third lens unit are Ra and Rb, respectively, at least one of conditions expressed by $$1.6 < Nd\ 31 < 1.9$$

$$40 < vd\ 31 < 60$$

$$1.45 < Nd\ 34 < 1.56$$

and $$-4 < Rb/Ra < -1.3$$

is satisfied.

27. A zoom lens according to claim 23, wherein said second lens unit has a negative lens and a positive lens in this order from the object side to the image side, and wherein if the Abbe numbers of the negative lens and the positive lens in said second lens unit are ν 21 and ν 22, respectively, a condition expressed by $$15 < v21 - v22 < 35$$

is satisfied.

28. A zoom lens according to claim 23, wherein the spacing between said second lens unit and said third lens unit at the wide-angle end and the spacing between said second lens unit and said third lens unit at the telephoto end are D23w and D23t, respectively, a condition expressed by $$0.3 < D23w/D23t < 0.9$$

is satisfied.

29. A zoom lens according to claim 23, wherein the focal length of the entire system at the telephoto end is ft, a condition expressed by $3.7 < ft/fw < 6.0$ is satisfied.

30. A zoom lens according to claim 23, wherein a back focus at the wide-angle end is bfw, a condition expressed by $$0.2 < bfw/fw < 0.4$$

is satisfied.

31. A zoom lens according to claim 23, wherein the back focus at the wide-angle end and the back focus at the telephoto end are bfw and bft, respectively, a condition expressed by $$0.05 < bfw/bft < 0.2$$

is satisfied.

32. A zoom lens comprising:
a first lens unit having a positive optical power;
a second lens having a negative optical power;
a third lens unit having a positive optical power, said third lens unit having a negative meniscus lens with a concave surface on the object side, a positive meniscus lens with a concave surface on the object side, a negative lens, and a positive lens, the negative meniscus lens, the positive meniscus lens, the negative lens and the positive lens being placed in this order from the object side to the image side, at least one of two surfaces of the negative meniscus lens being aspherical; and
a fourth lens unit having a negative optical power, said first to fourth lens units being placed in this order from the object side to the image side,
wherein zooming is performed by moving said lens units so that the spacing between said first lens unit and said second lens unit at the telephoto end is larger than the spacing between said first lens unit and said second lens unit at the wide-angle end, and so that the spacing between said third lens unit and said fourth lens unit at the telephoto end is smaller than the spacing between said third lens unit and said fourth lens unit at the wide-angle end, and
the refractive index and the Abbe number of the negative meniscus lens in said third lens unit are Nd31 and ν d31, respectively, the refractive index of the positive lens in said third lens unit is Nd34, and the radius of curvature of the lens surface on the object side and the radius of curvature of the lens surface on the image side of the positive lens in said third lens unit are Ra and Rb, respectively, at least one of conditions expressed by $$1.6 < Nd\ 31 < 1.9$$

$$40 < vd\ 31 < 60$$

$$1.45 < Nd\ 34 < 1.56$$

and $$-4 < Rb/Ra < -1.3$$

is satisfied.

33. A zoom lens according to claim 32, wherein said second lens unit has a negative lens and a positive lens in this order from the object side to the image side, and wherein the Abbe numbers of the negative lens and the positive lens in said second lens unit are ν 21 and ν 22, respectively, a condition expressed by $$15 < v21n - v22 < 35$$

is satisfied.

34. A zoom lens according to claim 32, wherein the spacing between said second lens unit and said third lens unit at the wide-angle end and the spacing between said second lens unit and said third lens unit at the telephoto end are D23w and D23t, respectively, a condition expressed by $$0.3 < D23w/D23t < 0.9$$

is satisfied.

35. A zoom lens according to claim 32, wherein the focal length of the entire system at the wide-angle end and the focal length of the entire system at the telephoto end are fw and ft, respectively, a condition expressed by $$3.7 < ft/fw < 6.0$$

is satisfied.

36. A zoom lens according to claim 32, wherein the focal length of the entire system at the wide-angle end is fw and the back focus at the wide-angle end is bfw, a condition expressed by $$0.2 < bfw/fw < 0.4$$

is satisfied.

37. A zoom lens according to claim 32, wherein the back focus at the wide-angle end and the back focus at the telephoto end are bfw and bft, respectively, a condition expressed by $$0.05 < bfw/bft < 0.2$$

is satisfied.

38. A camera comprising:
a finder optical system for observing a subject; and
a photographing optical system which forms an image of the subject on a photosensitive surface, said photographing optical system comprising a zoom lens according to claim 1.

39. A camera comprising:
a finder optical system for observing a subject; and
a photographing optical system which forms an image of the subject on a photosensitive surface, said photographing optical system comprising a zoom lens according to claim 9.

40. A camera comprising:
a finder optical system for observing a subject; and
a photographing optical system which forms an image of the subject on a photosensitive surface, said photographing optical system comprising a zoom lens according to claim 16.

41. A camera comprising:
a finder optical system for observing a subject; and
a photographing optical system which forms an image of the subject on a photosensitive surface, said photographing optical system comprising a zoom lens according to claim 23.

42. A camera comprising:
a finder optical system for observing a subject; and
a photographing optical system which forms an image of the subject on a photosensitive surface, said photographing optical system comprising a zoom lens according to claim 32.

* * * * *

UNITED STATES PATENT AND TRADEMARK OFFICE
CERTIFICATE OF CORRECTION

PATENT NO. : 6,661,584 B2
DATED : December 9, 2003
INVENTOR(S) : Takeshi Nishimura It is certified that error appears in the above-identified patent and that said Letters Patent is hereby corrected as shown below:

<u>Title page,</u>
Item [56], References Cited, U.S. PATENT DOCUMENTS, please insert
-- 4,822,152    4/1989    Yamanashi
   5,004,329    4/1991    Tsuchida
   5,170,292    12/1992   Yamanashi
   5,172,273    12/1992   Yamanashi
   5,272,566    12/1993   Aoki et al.
   5,831,772    11/1998   Nishio et al.
FOREIGN PATENT DOCUMENTS,
   6-214157     8/1994    Japan
   6-214158     8/1994    Japan
   6-222267     8/1994    Japan
   6-250087     9/1994    Japan
   6-250088     9/1994    Japan
   6-294932    10/1994    Japan
   2579215    11/1996    Japan
  10-301027   11/1998    Japan --

<u>Column 6,</u>
Line 27, please delete "-0.5" and insert therefor -- -0.05 --

Signed and Sealed this

Twenty-ninth Day of June, 2004

JON W. DUDAS
*Acting Director of the United States Patent and Trademark Office*